US010926180B2

(12) United States Patent
Gustafsson et al.

(10) Patent No.: US 10,926,180 B2
(45) Date of Patent: Feb. 23, 2021

(54) CONTROLLING A DISPLAY OF A COMPUTER DEVICE

(71) Applicant: KING.COM LIMITED, St. Julians (MT)

(72) Inventors: Dennis Gustafsson, Malmo (SE); Grant Lafarge, Malmo (SE); Gerardo Basurto, Malmo (SE)

(73) Assignee: KING.COM LTD., St. Julians (MT)

( * ) Notice: Subject to any disclaimer, the term of this patent is extended or adjusted under 35 U.S.C. 154(b) by 232 days.

(21) Appl. No.: 15/852,161

(22) Filed: Dec. 22, 2017

(65) Prior Publication Data

US 2019/0054380 A1     Feb. 21, 2019

Related U.S. Application Data

(60) Provisional application No. 62/547,369, filed on Aug. 18, 2017.

(51) Int. Cl.
| | |
|---|---|
| A63F 13/69 | (2014.01) |
| A63F 13/426 | (2014.01) |
| A63F 13/822 | (2014.01) |
| A63F 13/537 | (2014.01) |
| A63F 13/35 | (2014.01) |

(52) U.S. Cl.
CPC ............ *A63F 13/69* (2014.09); *A63F 13/35* (2014.09); *A63F 13/426* (2014.09); *A63F 13/537* (2014.09); *A63F 13/822* (2014.09)

(58) Field of Classification Search
CPC ...... A63F 13/69; A63F 13/426; A63F 13/822; A63F 13/35; A63F 13/537
See application file for complete search history.

(56) References Cited

U.S. PATENT DOCUMENTS

| | | | | |
|---|---|---|---|---|
| 2014/0235338 | A1* | 8/2014 | Hansson | G07F 17/32 463/31 |
| 2014/0342791 | A1* | 11/2014 | Hugh | A63F 13/80 463/9 |
| 2015/0343311 | A1* | 12/2015 | Cirlig | A63F 13/537 463/31 |

* cited by examiner

*Primary Examiner* — Kang Hu
*Assistant Examiner* — Thomas H Henry
(74) *Attorney, Agent, or Firm* — Saul Ewing Arnstein & Lehr LLP

(57) ABSTRACT

Controlling the display of a computer device to deliver functions of a new type of clicker game, in which a player can control the location at which a booster is created on a game board. This provides a player with many more strategic options over game play because the clearing effects of a booster can be targeted more effectively. A game element which a player selects (clicks) to remove a group of adjacent matching game elements is identified and its location on the game board is 'reserved'. When the game board refills, the 'reserved' location is not refilled, but remains as a 'soft void' in which a booster object can be created after refill has taken place. At that point the booster may be activated (automatically or by user interaction).

20 Claims, 16 Drawing Sheets

CONTROLLING A DISPLAY OF A COMPUTER DEVICE

CROSS-REFERENCE TO RELATED APPLICATIONS

This application is based on, and claims priority to, U.S. Provisional Application No. 62/547,369, filed on Aug. 18, 2017, the entire contents of which being fully incorporated herein by reference.

FIELD OF THE INVENTION

The disclosure relates to controlling a user interface of a computer device.

BACKGROUND

There are multiple technical challenges facing the designer of computer-implemented games to create a fun and compelling game. Three of these challenges can be broadly categorised into the following areas: 'engagement'; 'virilisation' and 'monetisation'.

We will look at 'engagement', which involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce players' sense of success and accomplishment.

One technical area where there are particular challenges in controlling the display of a computer device is in the design of computer-implemented games. Not only is there a requirement to create fun and compelling games, these games need to be delivered to a player in a seamless and engaging fashion, while adhering to complex game rules.

There are technical challenges in providing gameplay which is engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce players' sense of success and accomplishment.

A 'clicker game' is a type of casual puzzle game where the player is required to find patterns on a seemingly chaotic board. The player then has to identify two or more adjacent game elements of the same type on the game board and select (e.g. by clicking) those matched elements to then be removed from the board.

SUMMARY OF THE INVENTION

The present application is directed to controlling the display of a computer device to deliver functions of a new type of clicker game, in which a player can control the location at which a booster is created on a game board. This provides a player with many more strategic options over game play because the clearing effects of a booster can be targeted more effectively. In operation of the feature, the game element which a player selects (clicks) to remove a group of adjacent matching game elements is identified and its location on the game board is 'reserved'. When the game board refills, the 'reserved' location is not refilled, but remains as a 'soft void' in which a booster object can be created after refill has taken place. At that point the booster may be activated (automatically or by user interaction).

A visual indication can be rendered on the game board to mark the 'reserved' location prior to creation of the booster. This visual indication could be an image of the booster itself (perhaps greyed out), or a different image, or a blank space.

After refill, the booster object is created and is shown on the game board as a booster. The booster does not move once created while the board is being refilled. In some embodiments the booster object may act like a normal game element on a game board during play (for example it may move as a result of matching game elements below it being removed).

Embodiments of the invention enable a user to select a booster location by selecting the block to 'click' within the matching blocks. This permits them to locate a booster to achieve some particular strategic objective.

One particular advantage of selecting a booster location is that it allows two boosters to be deliberately created side by side, in order to cause a combo booster to be formed. Combo boosters have an effect which is generally greater and more exciting than each individual booster.

Different boosters are created dependent on the 'critical mass' of matching game elements.

A refill mechanism provides new game elements on the game board to replace those which have been removed. This can be according to a certain physics (falling under gravity for example). Any physics is possible. When refilling a board endpoint locations are identified for replacement game elements. According to a feature herein, when setting up a game board refill, no endpoint is allocated to the 'reserved' location, so it does not receive a game element. When rendering graphic visualizations for the refill taking place, the refill trajectories/paths are calculated for all endpoints, but not for the reserved location. Instead, the visual indication of the intended booster is rendered.

In one aspect the invention provides a method of controlling a user interface of the computer device on which a game board of multiple user-selectable game element is displayed, the method comprising:
  detecting a game element selected by a user;
  identifying a location on the game board of the selected game element;
  removing one or more elements from the game board, including the selected game element;
  providing replacement game elements on the game board to replace the removed game elements, except at the identified location;
  creating a booster object at the identified location, activatable at the identified location, after providing the replacement game element on the game board.

The step may be provided, wherein the game element selected by the user is one of multiple adjacent matching game elements, wherein the multiple adjacent matching game elements are removed. This corresponds to a so-called clicker game.

The step of providing replacement game elements can comprise designating end point location from the game board to receive respective replacement game elements, wherein the identified location is not designated as an end point and does not receive a replacement game element.

In one embodiment, the method can comprise a step of detecting a second game element selected by a user, removing that selected game element and possibly matching adjacent elements from the game board, providing replacement game elements and creating a second booster object at the identified location, wherein the booster object and the second booster object cause a combo booster to be created, activatable at one of the identified locations.

A visual indication can be provided on the game board at the identified location. This may be replaced by an image of the booster when the booster object is created. The booster object may be created after elapse of a timer period governed by a new booster timer, or after refill. Alternatively, a booster may be created in the identified spot and does not move once created.

The booster may be activated automatically when the game board is set after replacement of the game elements. Alternatively, the booster can be activated in response to user selection of the booster.

Replacement game elements may be provided according to a defined physics which defines a path along which replacement game elements are provided to the board, wherein the replacement game elements move along the path and over the identified location without refilling the identified location. It is noted that there may be more than one path during refill, and that one or more path may pass through the reserved location.

Matching game elements can be determined by matching game element characteristics.

The characteristic of a game object can be its colour. In that case, the colours of game objects in a data structure are copied into a "colour grid", and groups of adjacent blocks with matching characteristics can be detected. The characteristic of a game object can be indicated by one or a set of characteristics identifiers, such as a colour identifier. A grid of characteristic identifiers can be used to detect matches.

Aspects of the invention also provide a computer device in which the method is implemented, and a computer readable medium holding instructions for implementing the method. The code can be executed on a client device to control a display of the device. Parts or all of the code can be executed remotely, for example at a server, and generate data which is transmitted to a client device for controlling a display of the client device.

DESCRIPTION OF THE DRAWINGS

Embodiments of the invention will now be described by way of the accompanying drawings in which.

DETAILED DESCRIPTION OF THE INVENTION

The terms user and player are used interchangeably throughout this document and no specific meaning is intended using one or the other unless the context suggests otherwise.

In the following description of various implementations of the invention, reference is made to the accompanying drawings which form part thereof, and in which is shown by way of illustration various implementations in which the invention may be utilized. It is to be understood that the other implementations may be utilized, and structural and functional modifications may be made without departing form the scope of the present invention.

Figure 1:
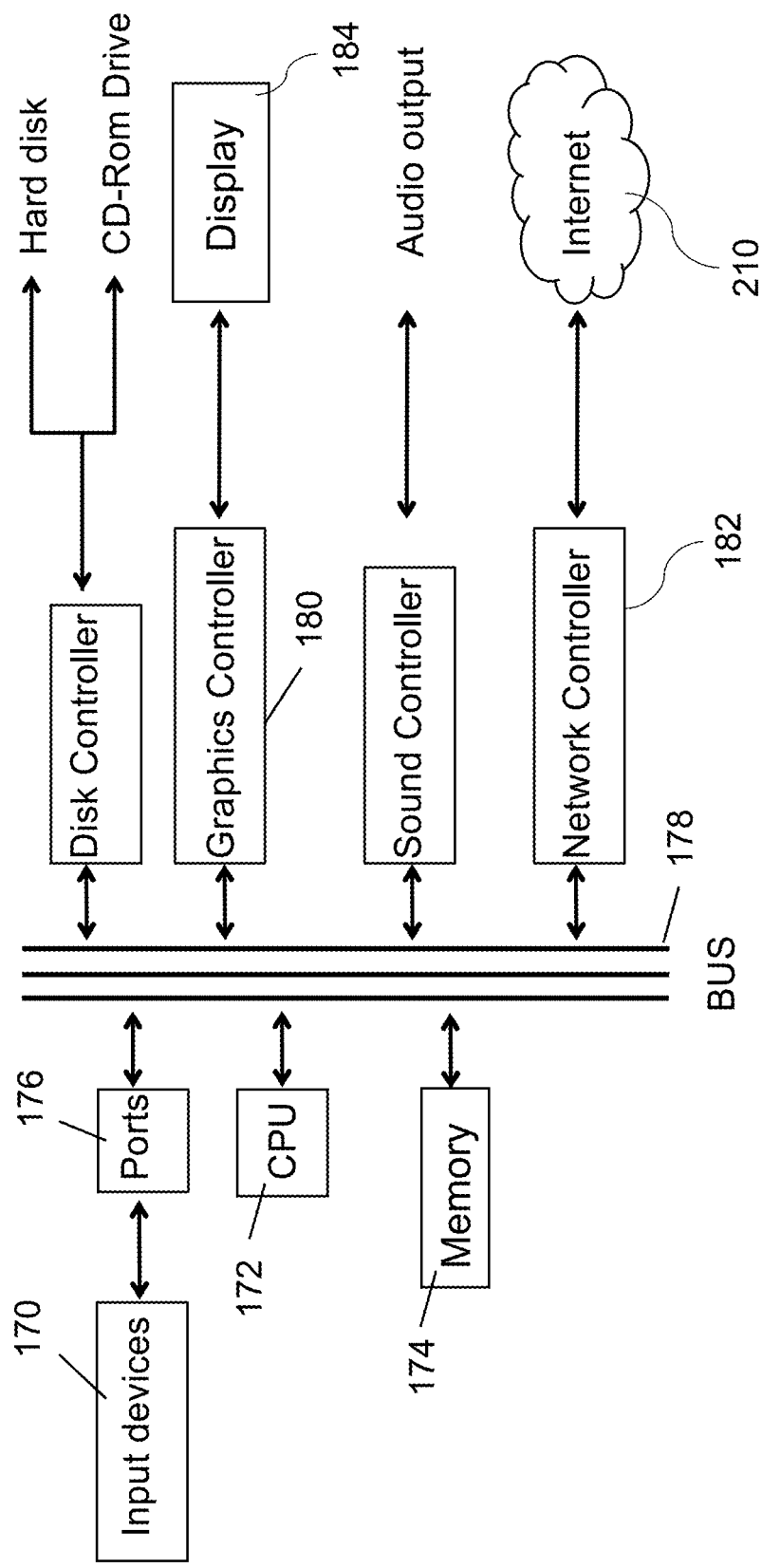
FIG. 1 is a schematic illustration of a computer device.

FIG. 1 shows a schematic picture of a computing device, containing a Central Processing Unit 172 and Random Access Memory 174. The CPU 172 acts according to input given from input devices 170 such as a keyboard, mouse or touchscreen. Computer buses 178 are used to communicate, both between input devices 170 and the CPU 172, but also between different controllers within the computer device, such as a graphics controller 180 and a network controller 182. These controllers in turn communicate with external devices, such as a display 184 for video output with which the graphics controller 180 communicates to present the game board, and the network controller 182 communicates with for instance the Internet 122, through wireless or wired connections. A user can interact with the computing device through input devices 170 such as a pointing device (e.g. mouse) and a keyboard.

Figure 2:
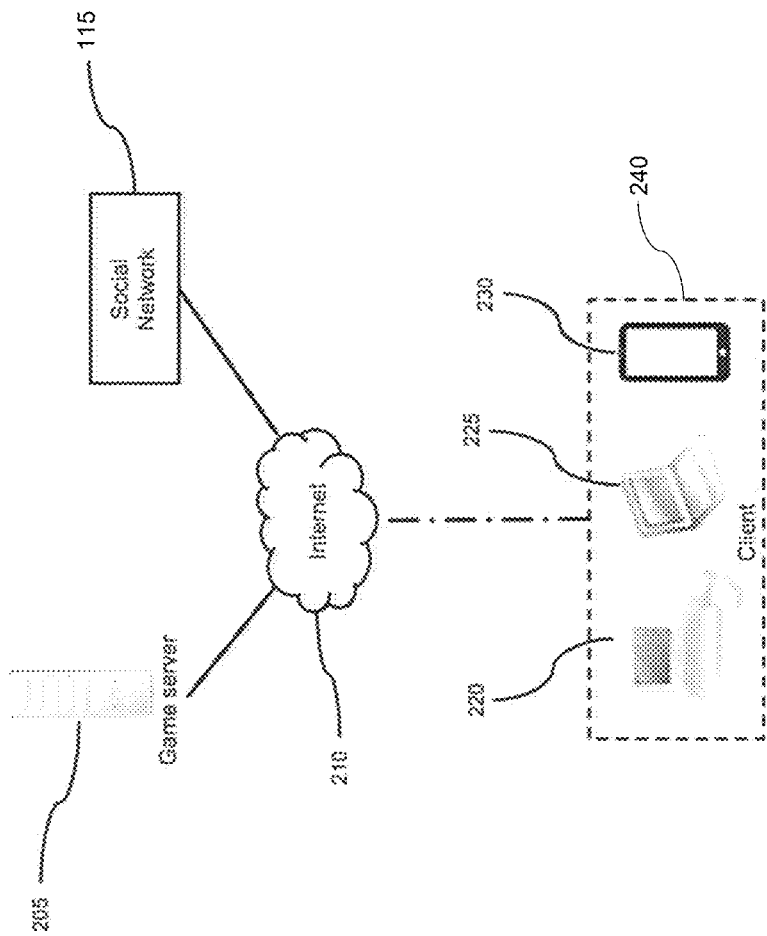
FIG. 2 is an exemplary computer environment.

FIG. 2 portrays an exemplary overall environment in which the present invention can be utilized. A virtual game is stored on for instance a game server 205. The virtual game is to be played on a client device 240, such as a computer 220, 225 or a smartphone or other handheld device 230. The client device 240 can also be a kiosk, arcade gaming station, smart TV or other device with computing capabilities, input devices and a screen that can present the game to a user. The client device communicates with the game server 205 and a social network server 215, for instance through the Internet 210 or other network. It should be understood that the social network server 215 and the game server 205 do not have to be located in different places, they could be on the same server or on a plurality of servers located in different locations. People skilled in the art will understand that other devices than the exemplary ones listed can also be used without departing from the spirit and scope of the invention. Different Implementations The techniques described in this patent can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone, etc.) to enable the client to render and display graphics and sounds; this 'web services' approach is increasingly common.

Another aspect is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance or to game information related to a social network to which the game is connected. It is possible to gather this data, store it and make use of it for instance to improve the game.

The following describes an implementation using a 'clicker' mechanic where groups of 2 or more objects (referred to in this document as blocks or game elements) are selected and automatically removed. FIG. 3A shows an example of a clicker game where one group of seven game elements of the same kind is highlighted using a dashed line. This group can be clicked and removed.

The following sections will refer to a game with a clicker mechanic. The ideas explained may also be implemented for games with other mechanics.

To exemplify the invention, one particular game will now be described. It will be evident that the features described herein may be applied in many different games.

Pet Rescue is an action puzzle game created by King.com. A player can make their way through a variety of levels in this clicker style adventure as you rescue pets from various situations, avoiding various obstacles, and fulfilling the ultimate objective to rescue the pre-defined number of pets to successfully complete one level and move onto the next.

The described game belongs to the (match-3) clicker genre. To play the game, a player clicks on any group of two or more touching blocks of the same colour, this will remove them from the game board. In the implementation of this game, new blocks may or may not appear on the game board depending on the particular area of the board. This encourages the player to think more strategically on how to identify a block to select to remove a group of existing blocks. Identifying as many matching blocks as possible to select in one click will give higher points.

Once removed, any blocks above the cleared combination fall down to fill the gaps created by the removed blocks, with the exception of the block that was clicked on, as described below.

In Pet Rescue Saga there are different goals to complete a level. Many levels have more than one goal that have to be reached in order to pass them.

Different goals that may be implemented are: Eliminate a certain percentage of the blocks on the board, obtain enough points to earn at least one star, save a minimum number of animals, complete the level and reach the bottom before running out of moves, complete special tasks: Save animals, Make a 20 block combo, and a time limit for a speed mode.

Saving animals may constitute a number of objectives requiring a number of different approaches. Animals can be trapped on top of columns. To save them, they need to be dropped to the bottom of the screen by removing blocks so that there are no more blocks beneath them. Animals may be trapped by other game elements that can only be removed by matching adjacent blocks, or by the resulting actions of boosters (explained in detail below). When this happens, the animal will be able to leave the puzzle board, and thus be saved. Blocks may be stacked on top of an animal's head, or other animals, without penalty. Some pets may exist inside carriers. Carriers of the same colour can also be matched with each other. Since the game can be both time, number of moves, and level based, the final result is decided upon different parameters depending on the final outcome of the session The game board is defined by a grid which defines tiles which make up the grid. A tile is a location which may support a block or have another quality e.g. a hole or blocker. The data structure which supports the grid is described in more detail later.

Holes in the grid show the background and are not valid game board areas. Blocks cannot occupy holes in the game board, but can fall through. The shape of the grid may vary. Blocks may also fall through a clicked game element in certain situations outlined below.

The game may be implemented having different standard game elements to be used in different levels. Not all of the game elements may be used in a level and the number of different types of game elements used may depend on the game designer and the difficulty to be achieved in the level.

The various types of block game elements may be characterised by the colour of the game element. In some implementations the block game elements may have a surface pattern (e.g. a star, square, circle, etc.) so that a colour blind player will also be able to differentiate between different colour types of block game elements.

FIG. 3 shows an example of a level. A group 302 of block game elements has a dotted line around it. These blocks are all the same colour, thus their colour characteristic matches and they can all be removed by clicking any one of the blocks within the group.

The game element blocks drop down to fill gaps on the game board. New blocks may be created which drop down from the top edge of the game board to fill any holes. These may be holes left by the dropping down of any lower blocks already present on the game board and previously positioned above those removed during gameplay. There may be further game elements within the level which prevent the block game elements or pets from falling down, and the game designer may implement certain rules for certain different types of game element.

Whether the colour characteristics of adjacent blocks match is determined by a match check. This check is carried out for the whole game board where there are crates. All crates on the game board are match checked against their immediately adjacent crates. When multiple adjacent crates are detected to have matching characteristics, a group of crates is formed such that even crates which are not immediately adjacent to each other are included in the same group so long as they are connected in an adjacent manner (i.e. not diagonally), via other crates which also possess the same matching characteristic. The match check is implemented before the player clicks on a crate. If the player hovers over one of a group of two or more matching crates with their selector, a glow or shimmer will appear. The shimmer appears around the specific crate to be selected when no adjacent matches are found, or extends to surround any adjacent matching crates to acknowledge all matches which occur in adjacent crates to the crate indicated for selection. In that case, an algorithm implemented in game code executed by a processor (described later) performs a match check for each position that the selector passes over. If any match is detected, the algorithm presents a shimmer or glow around the matching crates. When a move is actually performed, the grid will change due to the group of two or more matched crates being removed from the game board. A single crate, with no matching adjacent crate, is not removed from the game board as no match criteria is fulfilled.

The present disclosure relates to techniques for locating boosters. Boosters are special game elements which can perform certain functions to aid a user in their game play. Boosters can be provided as rewards for good gameplay or obtained in other ways. For example, these special game elements may remove all visible blocks of one colour, may remove all visible blocks in one column, or may remove all visible blocks in one row, etc. One example of one such a special game element is the line blast booster described in the implementation below.

There are different implementations on how to activate these special game elements called boosters. For instance they can be activated based on time, by being included within a group of game elements that are removed, or they can be activated by the player by clicking them.

When progressing through the game, different boosters may be unlocked and available for the player to use. These special game elements may require selecting by the player before the start of a level, selecting during a level, or get mixed into the game flow automatically, e.g. by falling into the game board randomly. As such they can be used by the player as part of the game play.

In implementations described herein boosters may be awarded during game play for activation by a user. The booster may appear as an element on the game board, at the location where a user selected it to be created. The location is determined by the block which is clicked by a user in a group of matching blocks. It may be activated at that location. For example, clicking a bomb block immediately causes it to detonate and clear all other regular blocks, regardless of colour, within a 2-block radius from the booster location, see FIGS. 11A and 11B. A booster may be created at a location after matching and removing a certain number of blocks in one move or click, and after refilling the game board. The location of the intended booster is not refilled. The required number of matched blocks to cause removal may be above a threshold number of blocks, within one or more predetermined ranges, or an exact number of blocks.

The booster type may also be determined in this way. That is to say, the number of blocks included in the match group (or 'critical mass' thereof) can determine the particular type of booster created as a result. For example, a line blast booster may be created when either eight or more blocks are matched, a bomb booster may be created when seven blocks are matched, and a column blast may be created when between four and six blocks are matched. Each block in the match group has a visual indicator (e.g. 702 in FIG. 7A) of the booster which will be created by selecting that group. The appropriate visual indicator may appear automatically when the group attains the size for a particular booster.

A visual indication may also be provided at the clicked block while refill is taking place. After refill, a booster object is created and a booster appears in the void (which may be showing the visual indication) left by the selected and removed game block.

Some boosters are implemented as score helpers. For example, multiplier blocks are a standard colour block with a multiplier effect. When used in a combo they double or triple the score depending on the multiplier effect. Multiple blocks can be cleared for super scores. This allows the designer to set high target scores for levels or star scores where each star is awarded depending on where the score falls within a set of predetermined ranges.

Boosters can also be combined to create combo boosters. This is achieved by creating or locating a booster adjacent to another booster, such that they are position side by side. When positioned in this way the boosters may be merged to create a further booster, for example by user input. The further booster may be of a different type to the original boosters which were combined, the same type but having an increased effect, or a combination of both. As a result a more useful or exciting booster can be created.

As indicated above, embodiments of the present invention concern a new way of creating boosters. As mentioned above, in some embodiments not only the location of the booster, but also the booster type may be controlled by user selection. Different types of booster blocks include: Bomb, Colour Bomb, Line blast, Ticking Bomb, etc. The functions of such boosters are known in the field of matching type games.

The operation of some boosters may be altered due to the fact that they are activatable at the location they are created. For example the bomb booster may in some instances be detonated while game elements in the area above the bomb detonation area are left undestroyed. These still intact game elements may fall down to fill up the area below.

By knowing a certain number of blocks removed will result in a specific type of booster being created a player can control the type of booster block they create. If the strategy of play requires the user to create a line blast booster, as is needed to reach the foliage in the example level shown in FIG. 3, the player may choose not to click on a group of blocks in order to remove them until the group has reached the required size such that the line blast booster would be created as a result.

The presently described method enables this booster block creation to be controlled even further by allowing the player to determine exactly where the booster is created. This is achieved by creating the booster at the exact position the player selected the group. That is to say the booster is created within the particular tile in which the block selected by the player was previously located.

Using this, a player is also able to more deliberately create a combination booster by causing two boosters to be created next to each other. This can improve the gameplay strategy and engagement of the player as it allows the player the opportunity to create boosters from combinations which may be specifically required in order to fulfil a task and complete the level or game.

The boosters created as a result of the combination might otherwise be difficult to create outright, e.g. by requiring the clearing of a particularly large number of blocks. Similarly they may otherwise be difficult to position, e.g. because the end location of a booster could not be accurately predicted by the player. Therefore in this way the player is provided with greater control over where the combined booster is created, and as a result a more strategic approach to completing the game is enabled based on the now more directly influencing actions of the player. In previous implementations boosters fell under the gravity physics of the game, and the action of combining boosters was achieved in a more random and chance based manner. In the present application these combinations are based directly on particular actions of the player.

Referring to FIGS. 3A-11B, an example implementations of booster creation are shown.

FIG. 3A shows a group of matching blocks, highlighted with a dashed line 302, which can be removed when one of the blocks in the group is clicked on by the player.

Figure 3B:
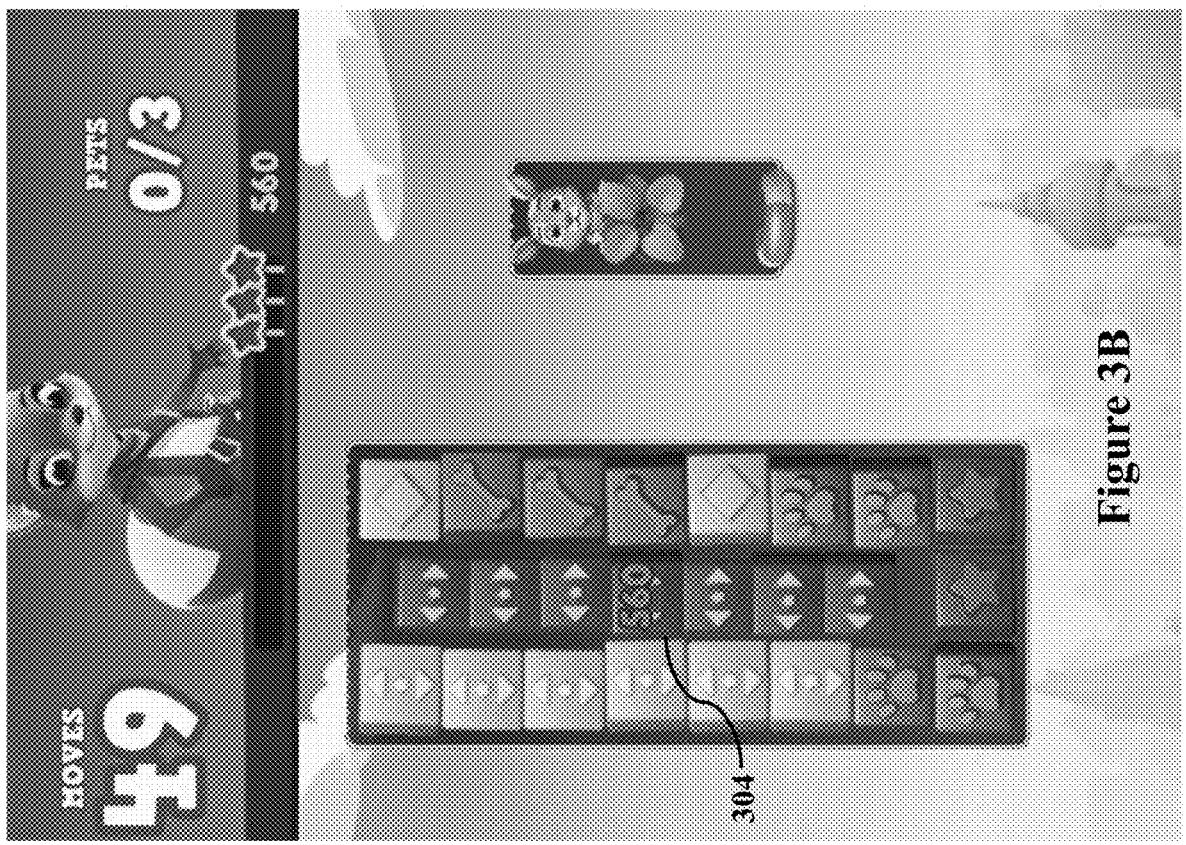
FIGS. 3A and 3B show an example game level and illustrate a match including seven blocks.
Figure 3A:
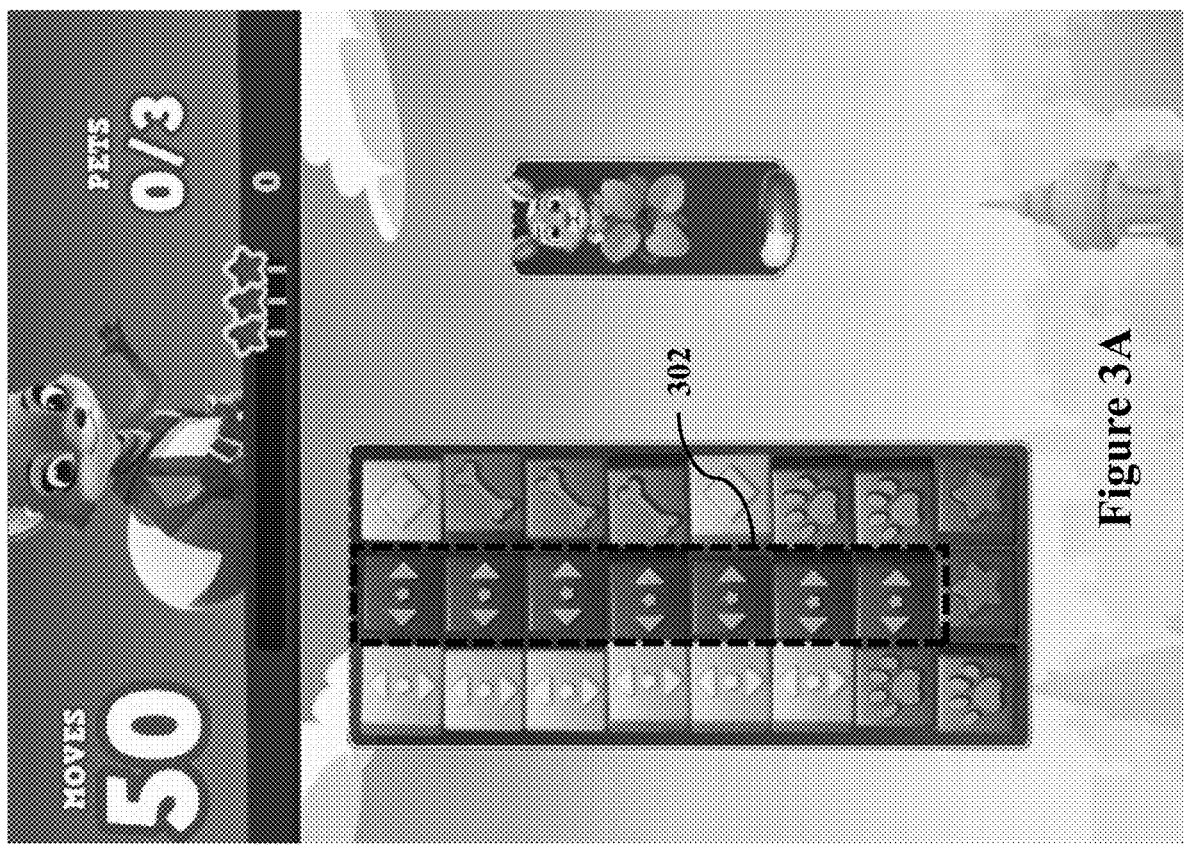

FIG. 3B shown the game board after the player clicks on the centre block 304 of the matching group of blocks. A score of 560 is shown above the block 304, and matching adjacent blocks are removed.

Figure 4B:
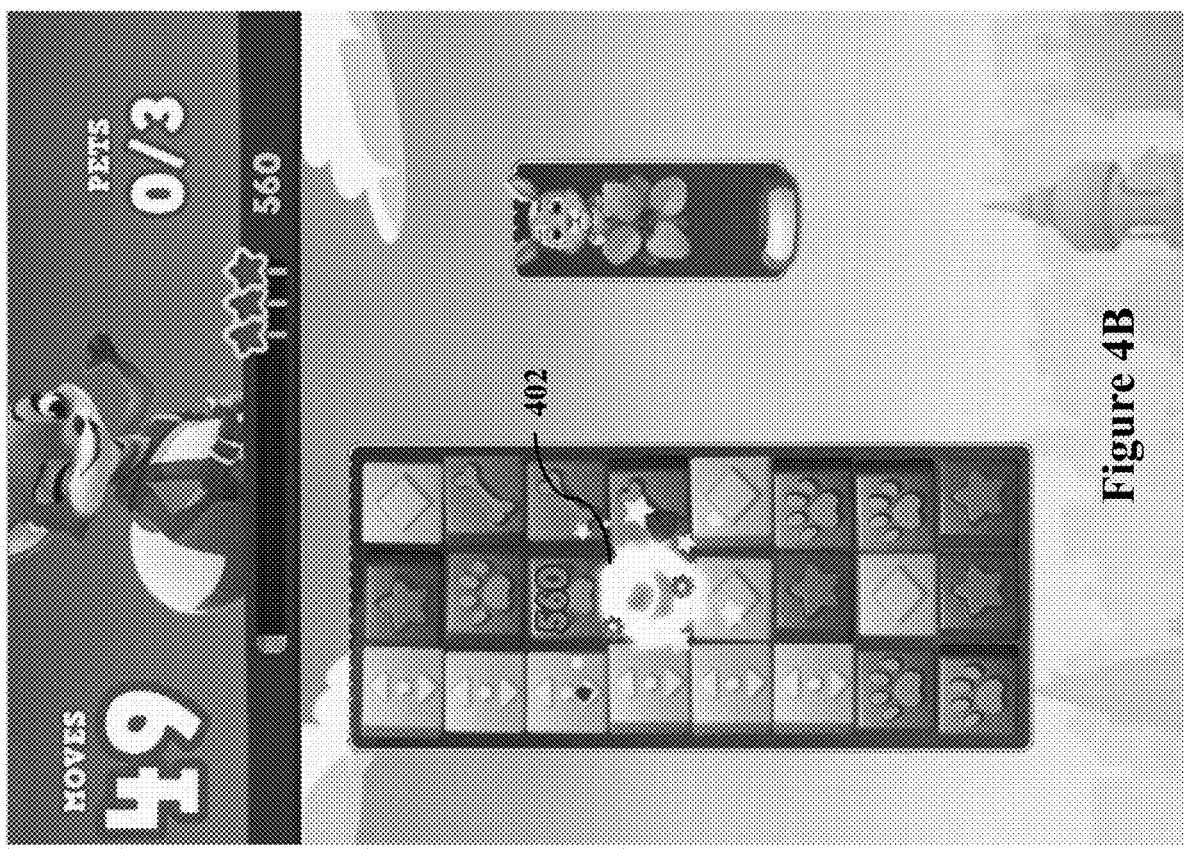
FIGS. 4A and 4B illustrate a cloud graphic created to indicate the position at which a booster is to be created, and the surrounding refill of the game board.
Figure 4A:
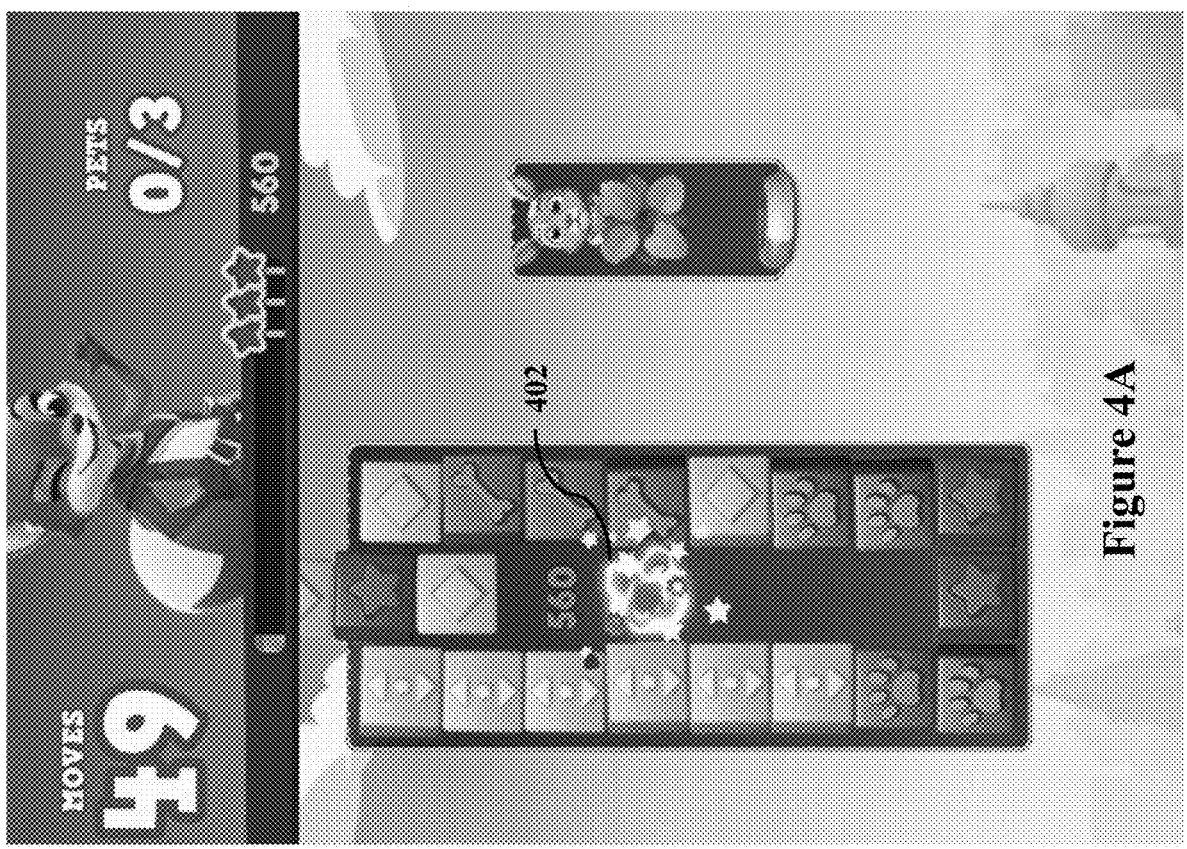

FIG. 4A shows a cloud 402 having been created to indicate where the player clicked. The cloud illustrates to the player the position of the block on the game board that was selected by the player, and thus the position of the expected booster. The cloud 402 acts as a placeholder, while new blocks refill other positions on the board, also referred to as a tiles of the game board grid. The placeholder element may be indicated by the cloud of dust or smoke as illustrated, by an under construction sign, by a greyed out version of the expected booster, or another such graphic as determined by the game designer. In this way the player is not presented with an empty gap on the game board and knows to expect the booster to be created at that position. At this time no booster element has been created or entered the game loop. Thus there is no element at this position which acts in keeping with the physics of the game world, e.g. gravity.

FIG. 4B shows the board refilling around the cloud graphic 402, which fills a gap in the refilled space. New blocks created to refill gaps underneath the selected tile are shown or allowed to pass through the cloud 402 and settle in the gaps on the other side of the cloud. The cloud indicator is unaffected by the physics of the game, and has no effect on the currently displayed blocks or new blocks (the position of the indication is a 'reserved' tile).

The creation of booster blocks will now be described.

Figure 5A:
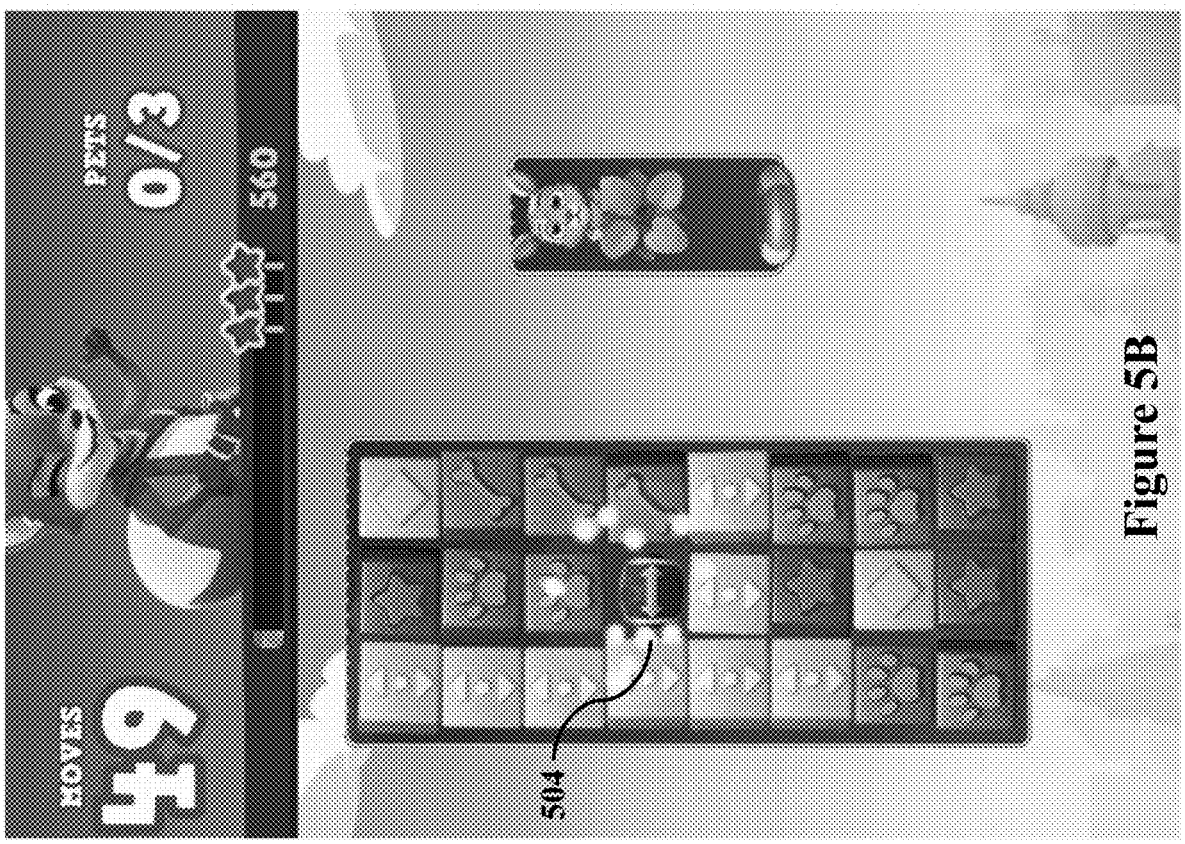
FIGS. 5A and 5B illustrate a the creation of a booster at the selected position on the game board.

FIG. 5A shows the formation of a bubble 502 in the tile previously occupied by the cloud 402. An image of a column blast is shown on each block within the group of yellow blocks. The bubble 502 contains a booster 504. The booster 504 which is created in this example is a row line blast, which resulted from the red group 302 being 'clicked'. The row line blast clears all the blocks on the same row as itself, irrespective of their characteristics. The booster is only created once the new blocks have filled the gaps in the game board around the cloud 402. The booster is created in the sense that a game element with particular properties and behaviour is add to the board. E.g. properties with regard to how the physics of the game world apply to it and behaviour relating to the effect it has on other game elements on the board, The line blast booster block 504 has been created at the same position within the game board where the group of matching blocks was selected by the player. This allows the player to have added control over the placement and subsequent use of the booster. With this extra control the player is able to direct and optimise game play in a way that helps them to achieve the objective of the level in a more strategic and planned way.

Figure 5B:
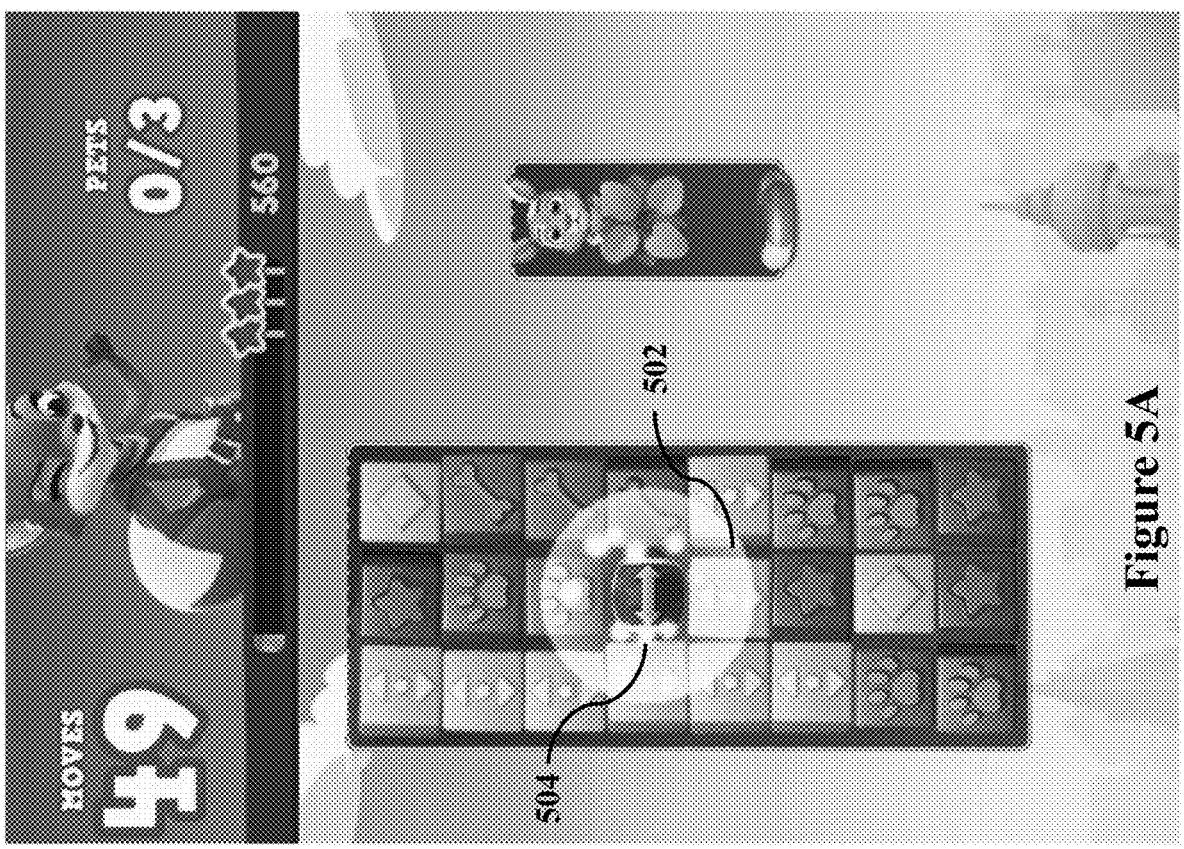

FIG. 5B shows the booster block outside of the bubble and ready to be activated. The player is then able to click on the created booster in order to activate it.

The booster is activated at the location where it has been created.

Figure 6A:
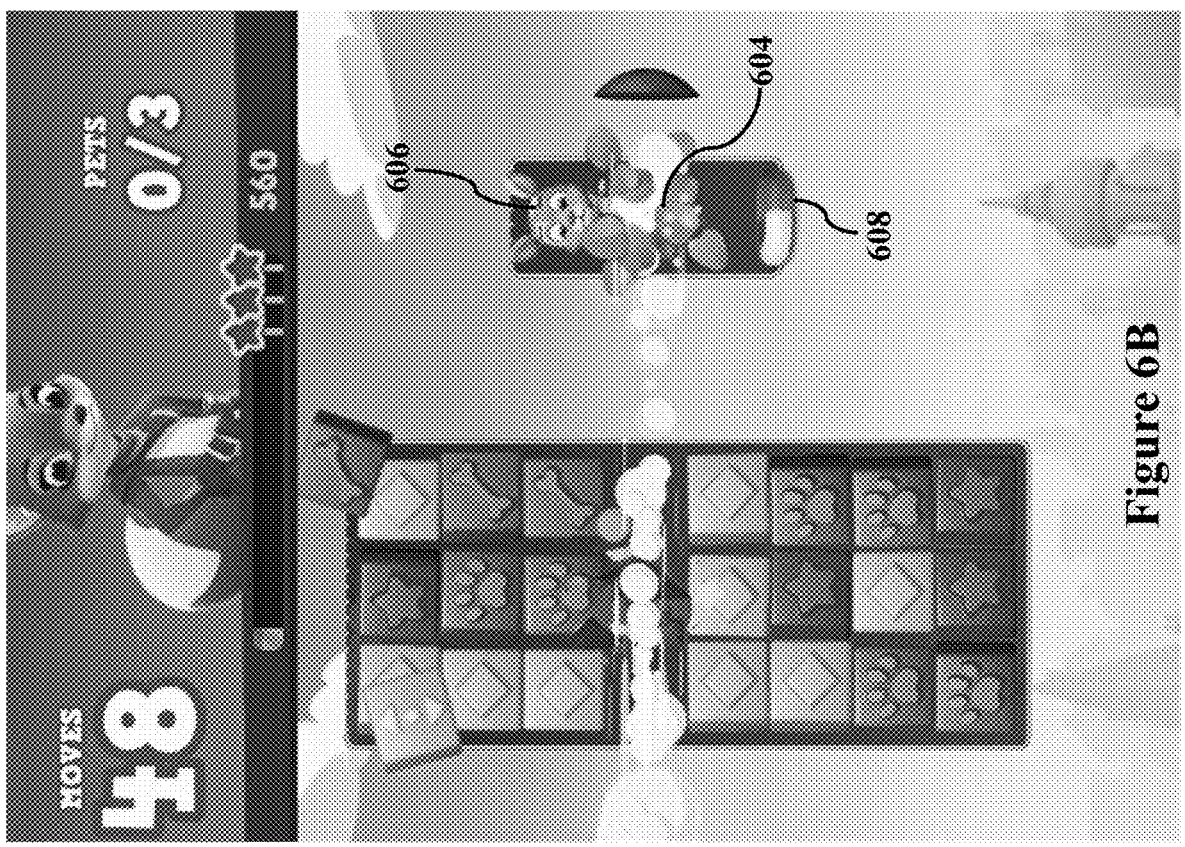
FIGS. 6A and 6B illustrate the action of the activated booster at the selected position.

FIG. 6A shows the booster 504, having been created at the position the player would like it to be used, has been activated and behaves as normal. In this example the booster is a row line blast booster. As can be seen, the blocks on the same line as the booster are cleared by laterally travelling elements 602.

Figure 6B:
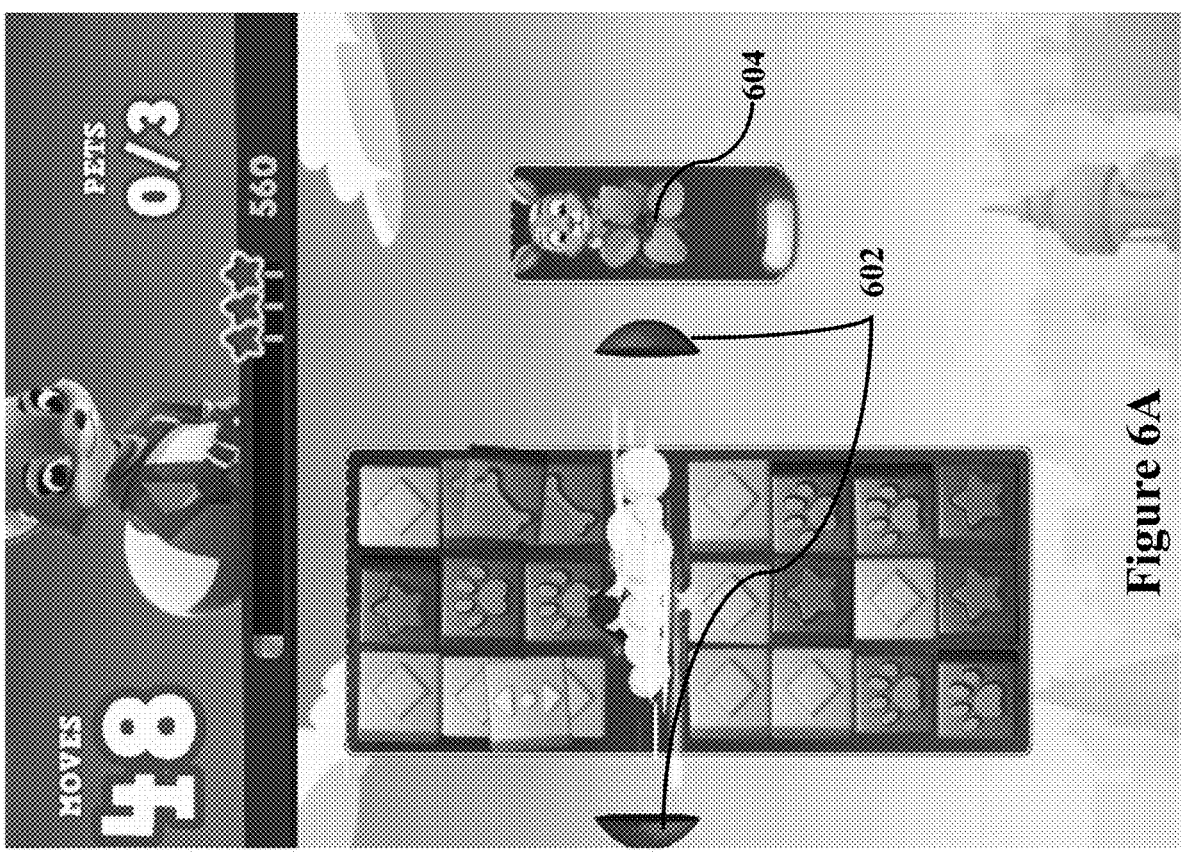

FIG. 6B illustrates a further consequence of the line blast as the foliage 604 upon which the pet is sitting is also cleared. The foliage 604 is a blocker game element and is preventing the pet 606 from reaching the life ring 608 and being rescued. By enabling the player to select a specific block of the matching group, both to instigate the clearing of the matching blocks and the location of the booster creation, the player can choose the line on which the line blast is needed in order to clear the foliage 604 and save the pet 606. Thus an added layer of control and possible strategy is enabled.

Figure 7A:
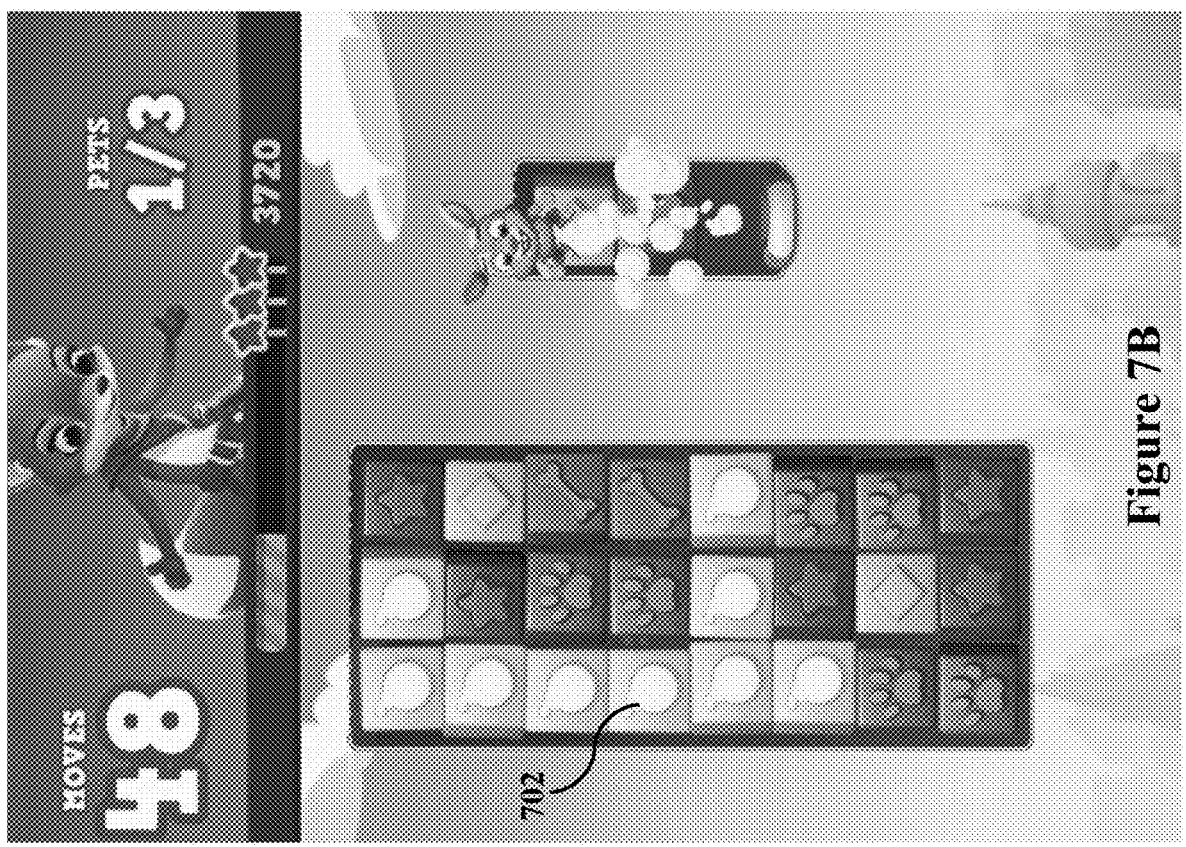
FIGS. 7A and 7B illustrate a pet reaching the target location in order to be saved.
Figure 7B:
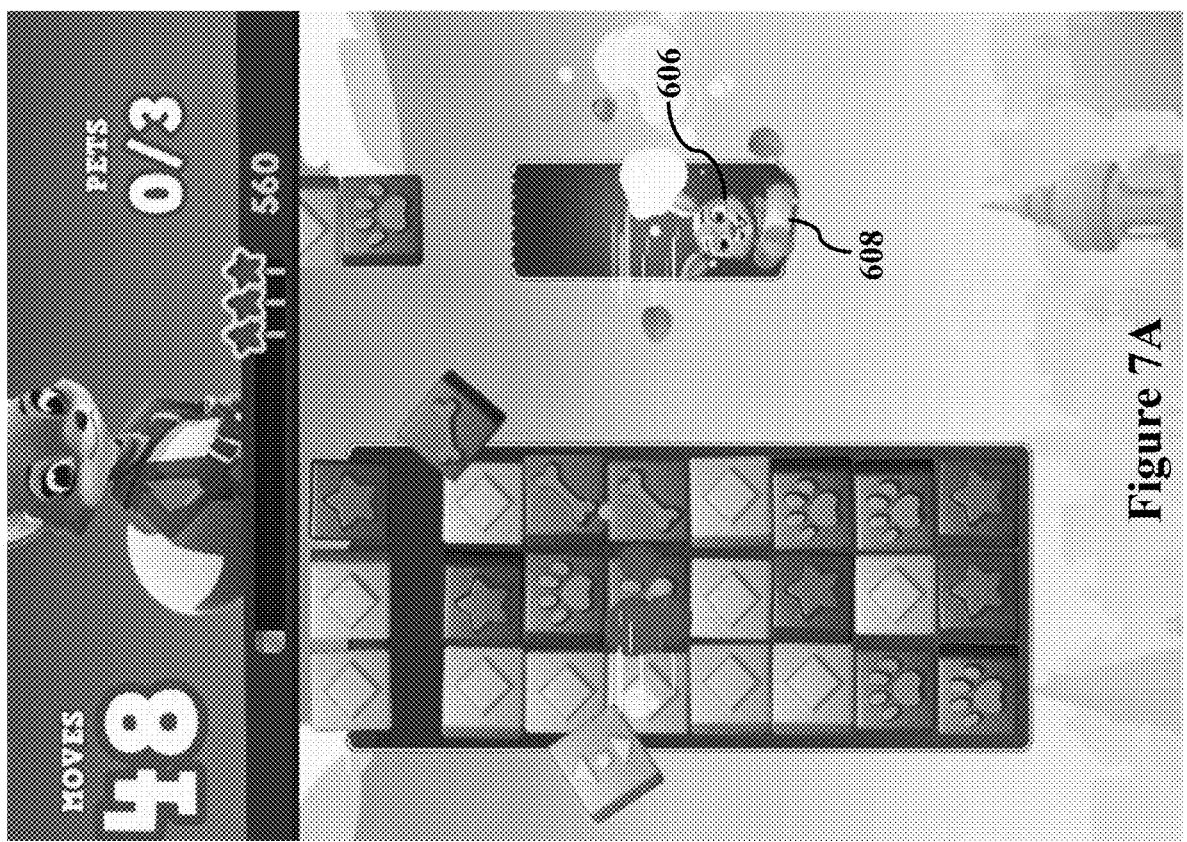

FIG. 7A shows the pet 606 having reached the safety of the life raft 608. The gaps on the game board left by the cleared blocks 302 have been refilled. In FIG. 7A the blocks have no 'booster image'. FIG. 7B shows the rescued pet flying up toward the top of the game board to safety. Also in FIG. 7B, the image 702 of a bomb is shown in each yellow block of the group. This is because the group is now large enough to create this type of booster.

Figure 8B:
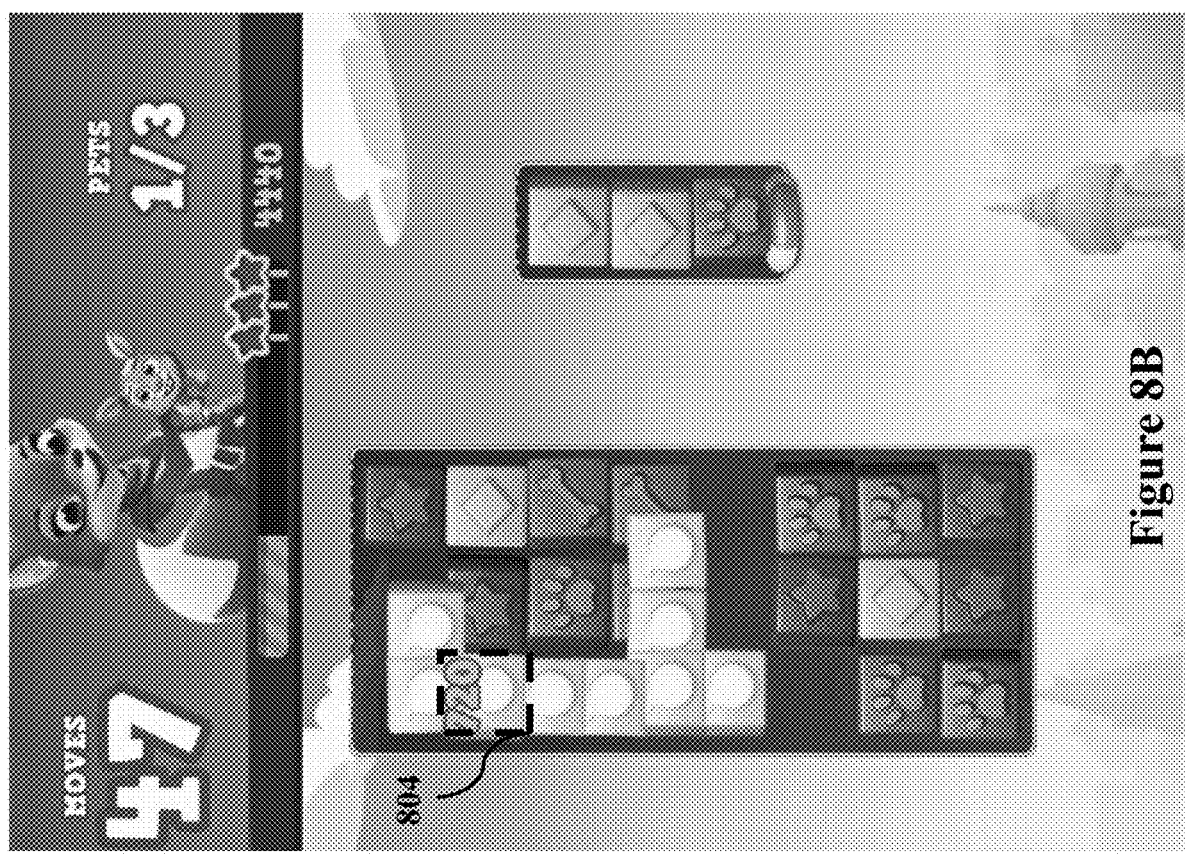
FIGS. 8A and 8B show an example game level and illustrate a match including nine blocks.
Figure 8A:
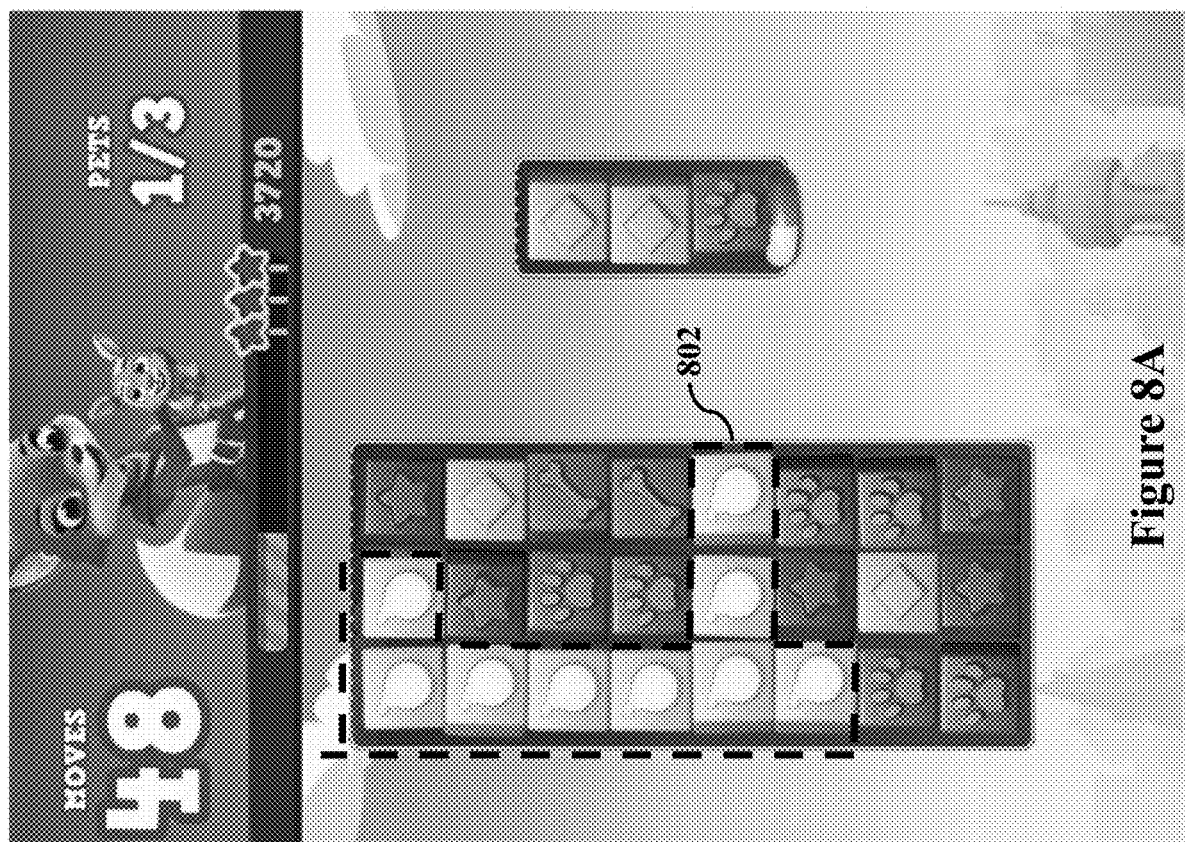

FIG. 8A shows a now filled game board with a number of matching blocks 802. FIG. 8B shows these matching blocks having been selected by a user at grid position 804. The matching blocks are then removed from the game board.

Figure 9B:
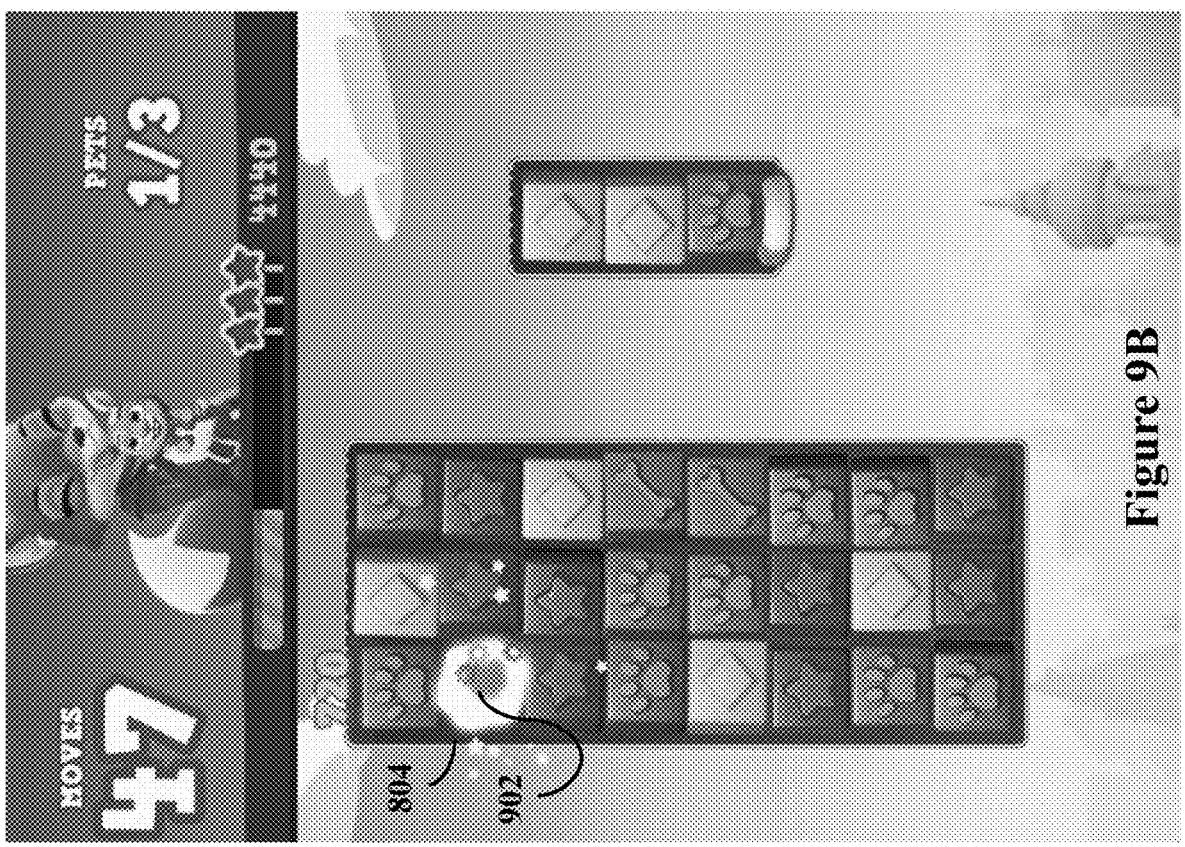
FIGS. 9A and 9B illustrate a cloud graphic created to indicate the position at which a booster is to be created, and the surrounding refill of the game board.
Figure 9A:
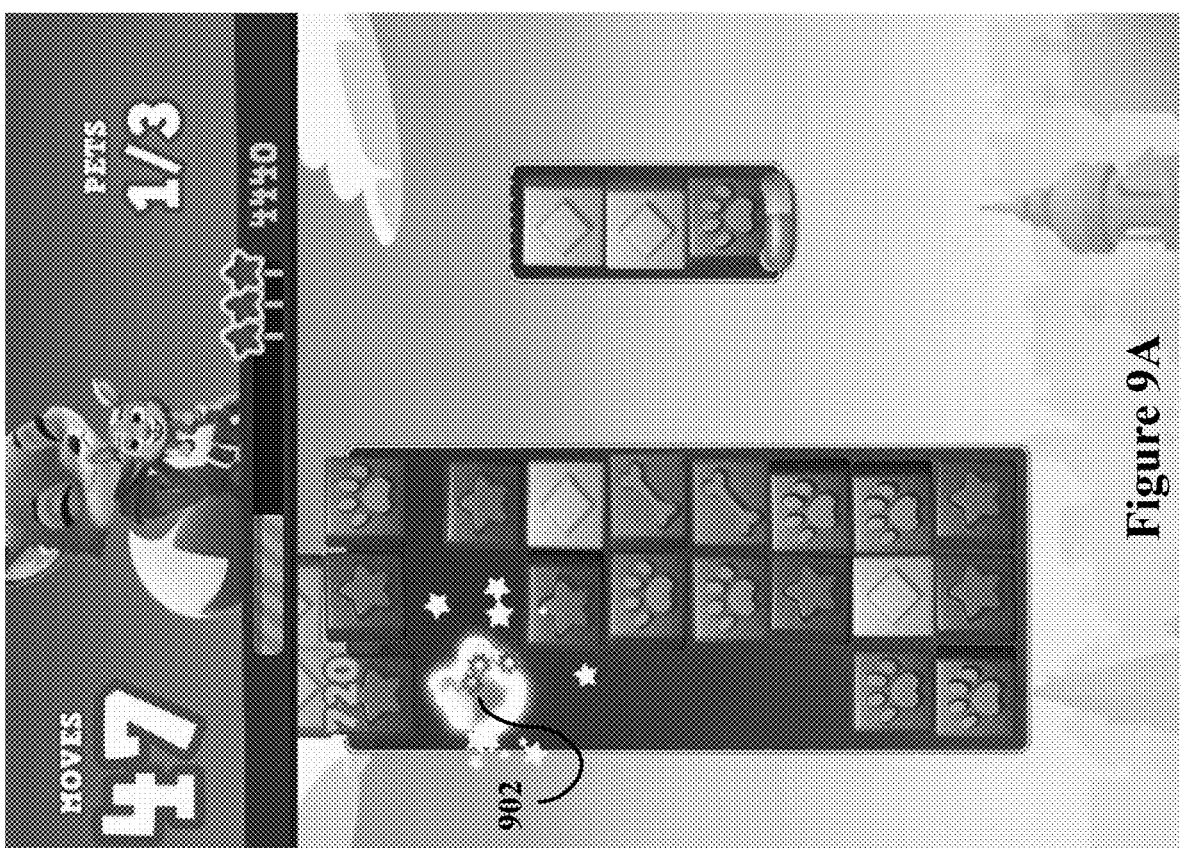

FIG. 9A shows the formation of a cloud graphic 902 at the same location 804 on the game board. FIG. 9B shows the game board refilling, with the cloud 902 indicating the position at which the booster will be created. The new blocks fall into positions such that they fill the gaps in the game board, but are not affected by the cloud 902. The grid position 804 is not filled by any of the new blocks.

Figure 10B:
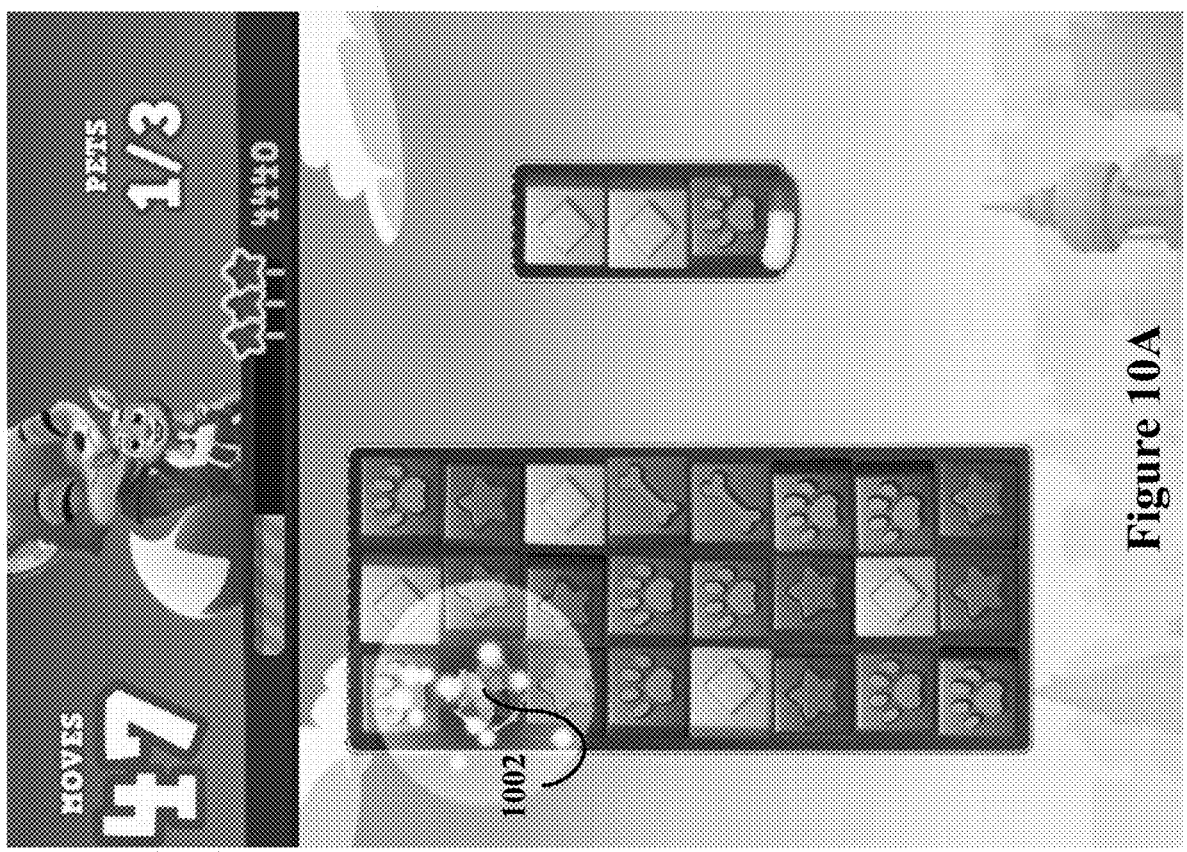
FIGS. 10A and 10B illustrate the creation of a bomb booster at the selected position on the game board.
Figure 10A:
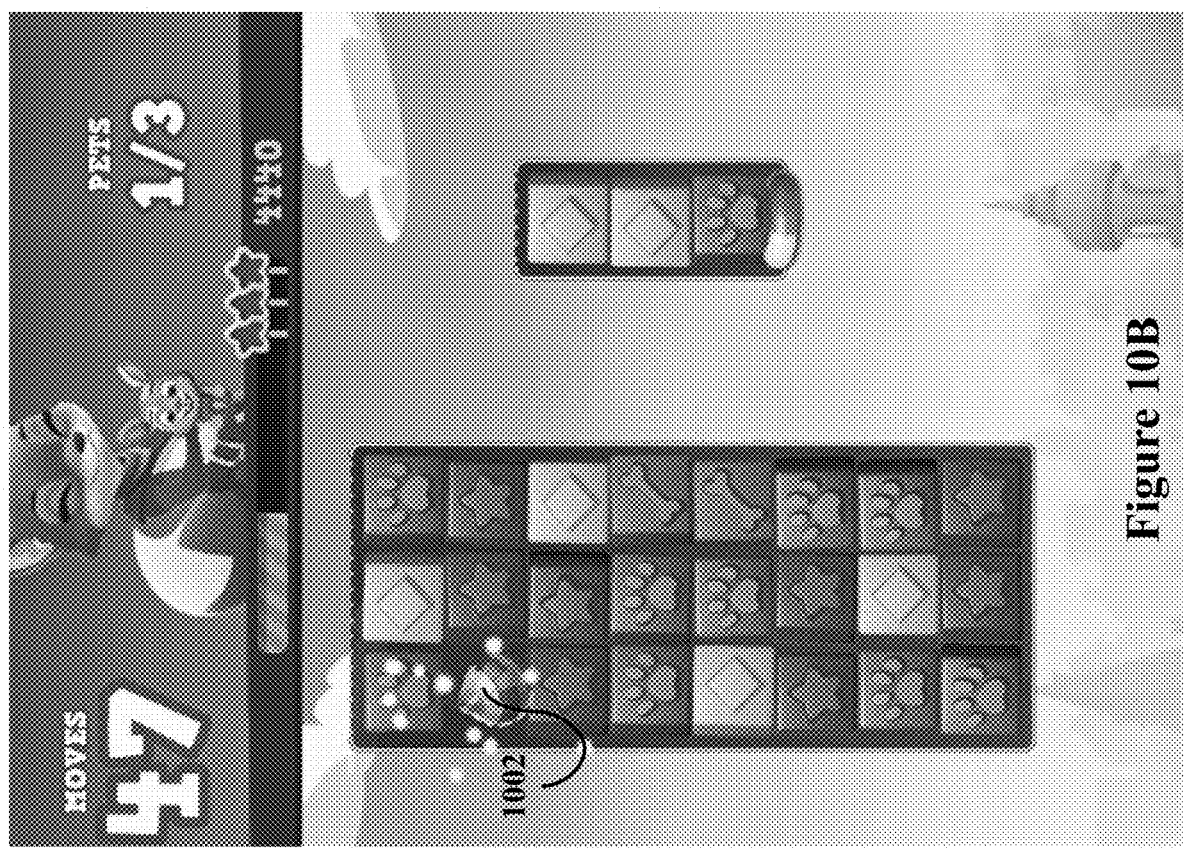

FIG. 10A shows the creation of the booster 1002 at position 804 inside a bubble as previously show in FIG. 5A. FIG. 10B shows the booster 1002, created and ready to be activated. The booster 1002 is a bomb type booster which when activated clears blocks in a 2-block radius from its position on the game board.

Figure 11B:
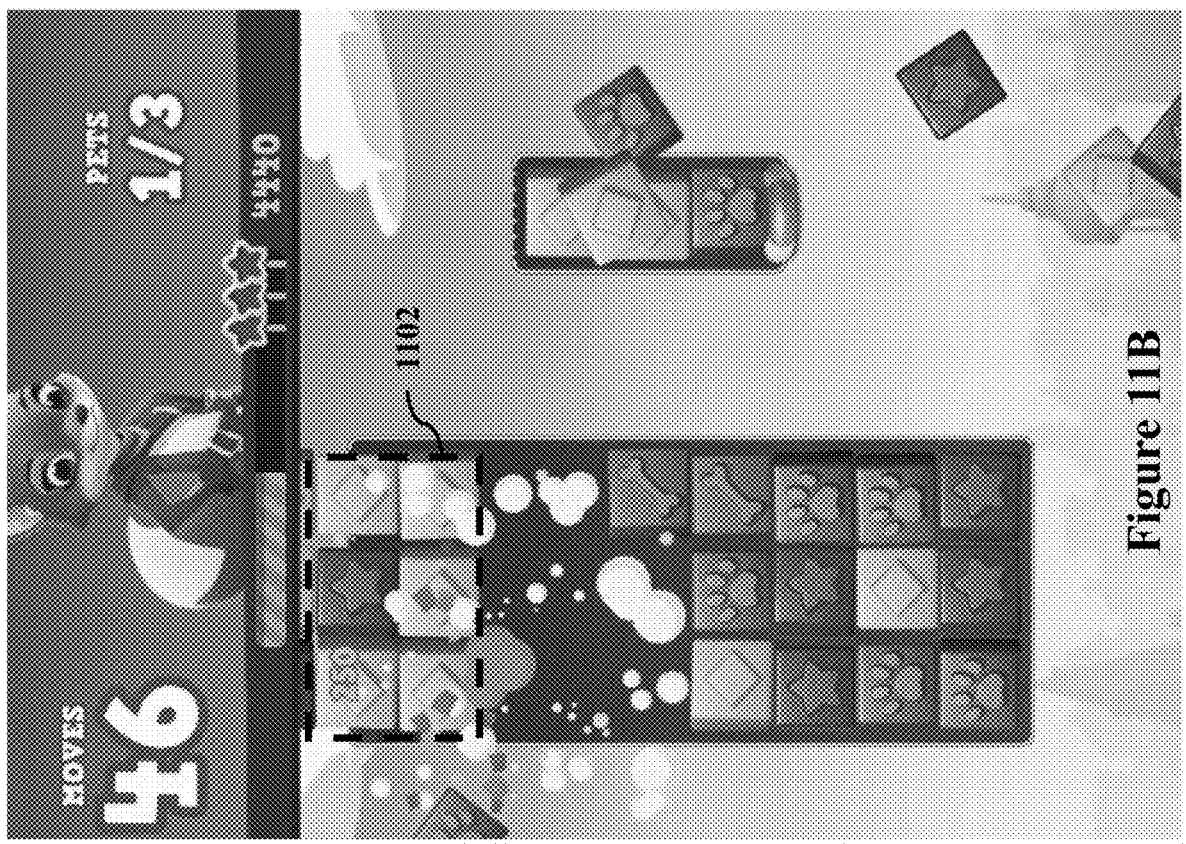
FIGS. 11A and 11B illustrate the action of the activated booster at the selected position and the subsequent refilling of the game board.
Figure 11A:
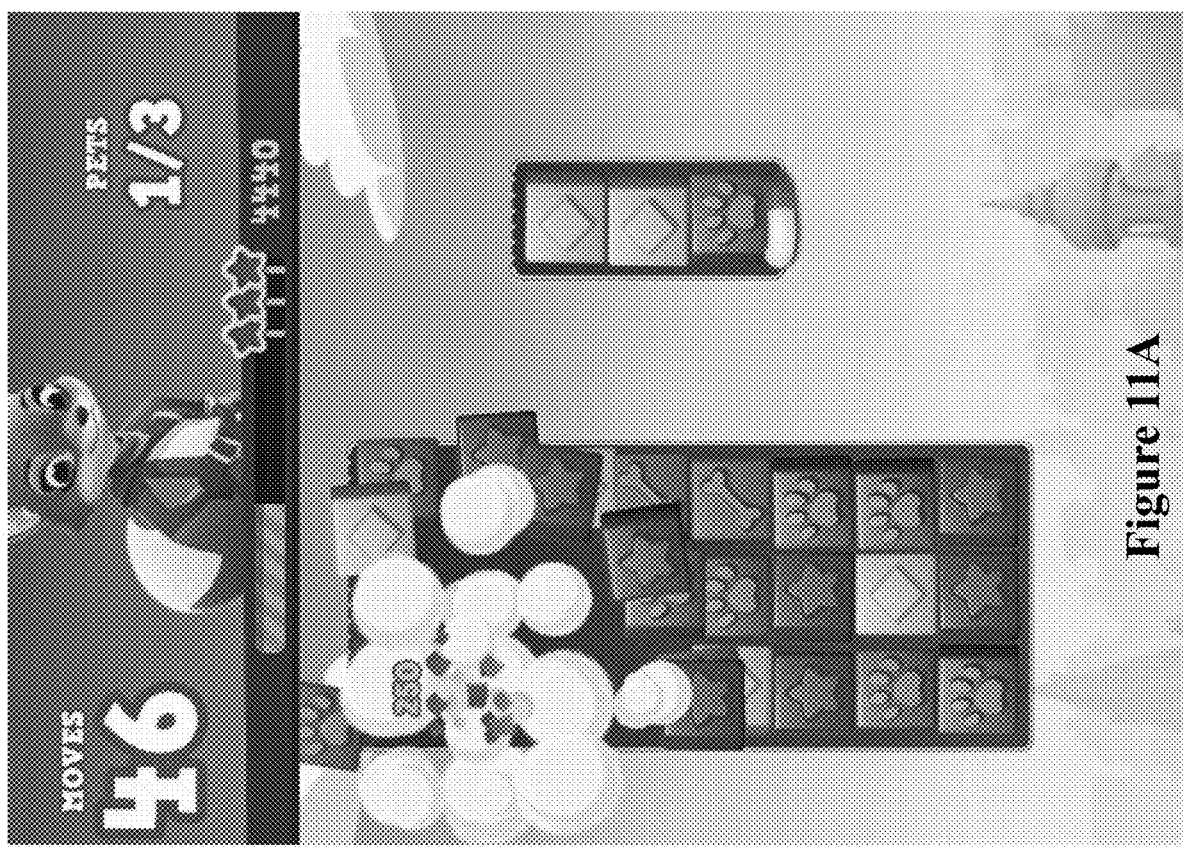

FIG. 11A shows the bomb booster 1002 having been activated. The tile positions surrounding location 804 are covered in a bomb debris cloud, different to the construction cloud 902, and indicating the radius of the blast and subsequent block clearance. FIG. 11B shows the gap left on the game board after the bomb booster 1002 has been used. New blocks 1102 are shown entering the top of the game board in order to fill the gaps.

Figure 12:
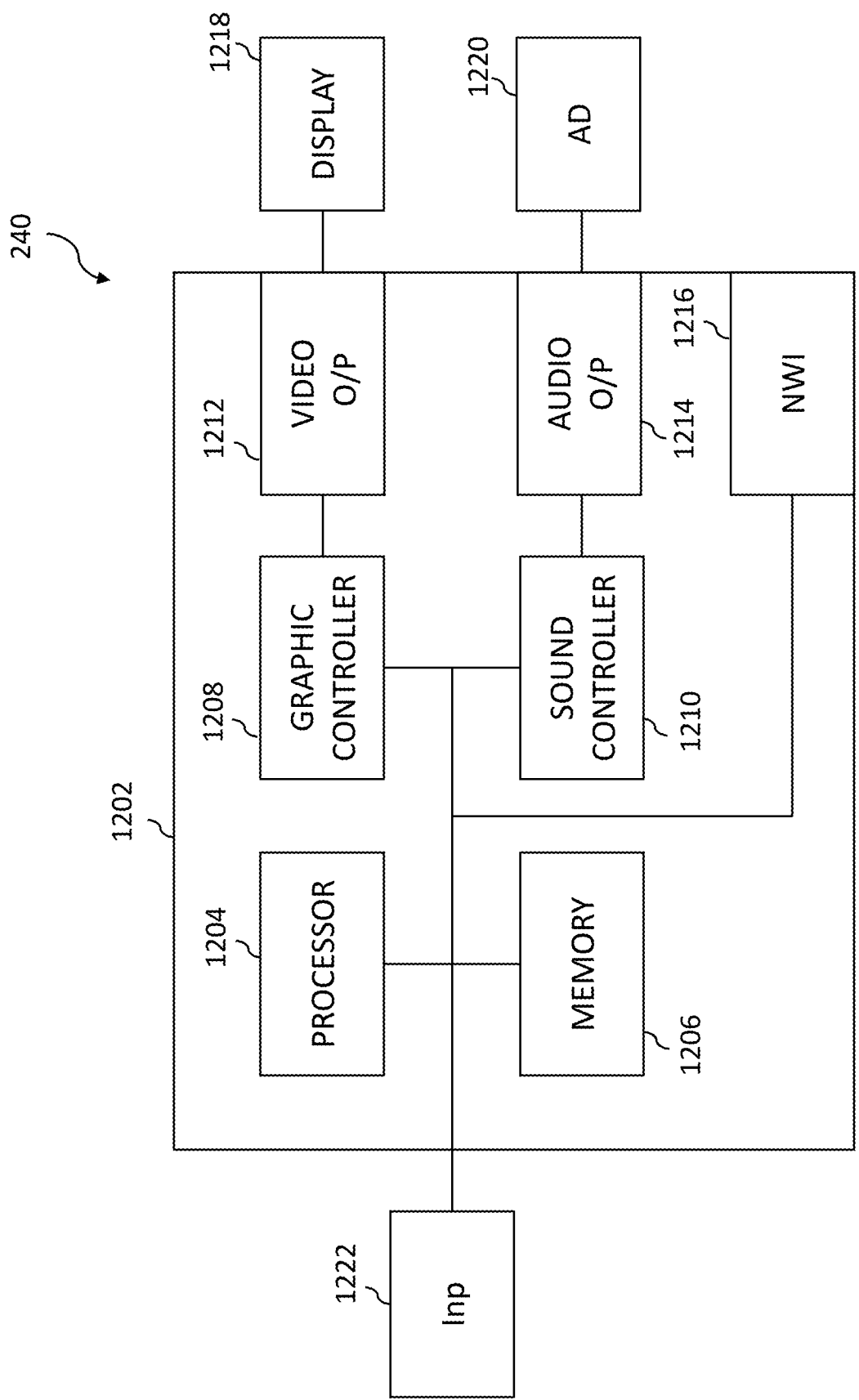
FIG. 12 is a schematic view of a user device.

A schematic view of a user or computing device 240 according to an embodiment is shown in FIG. 12. The user device has a controller 1202. The controller 1202 may have one or more processors 1204 and one or more memories 1206. The controller 1202 is also shown as having a graphics controller 1208 and a sound controller 1210. It should be appreciated that one or other or both of the graphics controller 1208 and sound controller 1210 may be provided by the one or more processors 1204. Other functional blocks may also be implemented by suitable circuitry or computer code executed by the one or more processor 1204.

The graphics controller 1208 is configured to provide a video output 1212. The sound controller 1210 is configured to provide an audio output 1214. The controller 1202 has an interface 1216 allowing the device to be able to communicate with a network such as the Internet or other communication infrastructure.

The video output 1212 may be provided to a display 1218. The audio output 1214 may be provided to an audio device 1220 such as a speaker and/or earphone(s).

The device 240 may have an input device 1222. The input device 1222 can take any suitable format such as any one or more of a keyboard, mouse, touch screen, joystick or game controller. It should be appreciated that the display 1218 may in some embodiments also provide the input device 1222, for example, by way of an integrated touch screen.

The blocks of the controller 1202 are configured to communicate with each other via an interconnect such as a bus or any other suitable interconnect and/or by point to point communication.

It should be appreciated that in some embodiments, the controller 1202 may be implemented by one or more integrated circuits, at least in part.

Referring again to FIG. 2, the game server 205 may communicate via the network 210 to the one or more user devices 240 and may further provide connections to a social network such as Facebook™. The server 205 may be able to obtain user information via the social network 115. Such user information may include contacts of the user.

It should be appreciated that embodiments may be deployed in different system architectures. For example, the computer game may be implemented as a computer game that is stored in the memory 1206 of the user device 240. However when online, the server 205 may handle some elements of the game in some embodiments. By way of example only, a Java game applet may be provided to the user device 240 and the locally running Java applet will generate, for example, the graphics, sounds, and user interaction for the game play on the user device 240. Java applet can have sufficient information to allow offline play when the user device is no longer in communication with the game server 205, e.g. if connectivity is lost.

In some embodiments, the game may be implemented as a computer program that is stored in a memory of the system, for example the server 205, and which runs on the processor of the game server. Data streams or updates are supplied to the user device 240 to allow the user device 240 to render and display graphics and sounds in a browser of the user device 240.

Figure 13:
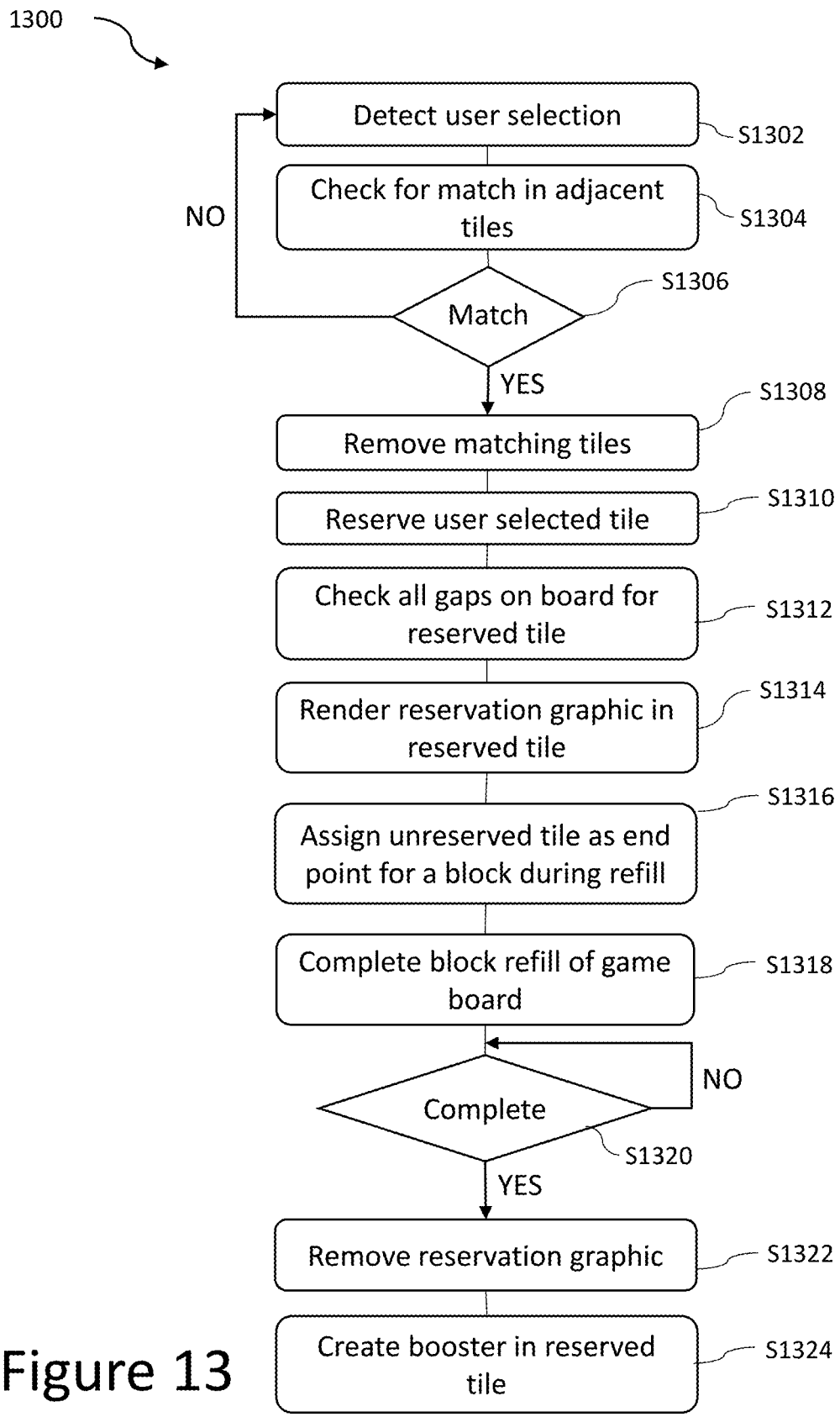
FIG. 13 shows a flow diagram depicting game logic for the location specific creation of boosters.

FIG. 13 shows a flow diagram depicting game logic for the location specific creation of boosters. The flow diagram illustrates a booster creation component 1300. The booster creation component 1300 has a responsibility for performing both a match check and a reservation check. A match check is performed when a user selects a block. If the match check returns a positive result, i.e. the selected block is adjacent to one or more blocks with a matching characteristic, all the matching blocks are removed from the game board. The match is also called a combo, as actions on the blocks can be combined together and have a single outcome in the game play counted as one move. Data on the characteristics of each game element found within each tile of the grid is used to detect matches. The check is performed by detecting colour matches in and around the user selected position. A reservation check is performed when gaps in the grid resulting from a preceding successful match are ready to be refilled. A tile is reserved as a result of a user selecting the block at that tile and successfully creating a match. If a tile of the grid is reserved the subsequent refilling of this location is prevented.

After detecting user selection of a block S1302, the match check S1304 is carried out. When a player tries to make a move, the algorithm performs a match check at the position of the block the user selects, as well as any adjacent positions which have matched. If a match is detected, the algorithm continues to the next step S1308 and the move will start. Thus, in step S1304, a check is made to see whether any combination has resulted including the selected block and one or more blocks in adjacent tiles. If a match has resulted, the move continues to step S1308. If no matching combination of blocks has been detected at the selected location on the game board, then no further action is taken until the user selects another block. When the game performs a check for potential matches there is no guarantee that a match or combo will occur.

If the result of the match check is yes, the two or more matching blocks will be removed from the game board S1308.

The algorithm then proceeds to the next step S1310, where the user-selected tile is designated as a reserved tile. This reservation is located specifically at the position on the game board grid occupied by the block selected by the user.

In the next step S1312 all gaps on the game board, e.g. resulting from the removal of matching blocks, are checked for a status of a reserved tile. This step identifies all the empty tiles which are reserved, so that they are not 'filled' during refilling of the game board.

Once the reserved tile is identified, a reservation graphic is rendered in this tile S1314 as a visual indication. The reservation graphic indicates to the user the exact grid location selected, and allows them to anticipate further events at this position on the game board (such as a booster).

The cloud in FIGS. 4A and 4B acts as a visual indication to the user of the reserved gap. The reserved gap is reserved by not assigning this particular empty tile as the endpoint or end trajectory of any block. Thus the reserved gap does not receive a block during the resulting movement of blocks on the board. The physics of the game is not limited or changed by the reservation. The entry and movement of blocks on the game board can be from and in any direction.

Any gaps on the game board which do not coincide with a reserved tile are then assigned for refilling S1316. That is to say, any unreserved empty tile is assigned as the end point of an end trajectory for a block in the refilling action of the game board. The refill block is either a pre-existing block from another position on the game board, or a new block yet to enter the visible area of the game board. The end point is designated by referring to the tile of the game board grid.

In the next step S1318 the game board is refilled. The refill is completed as per a typical refill action, but with an important difference that reserved tiles are not refilled. That is to say, all unreserved gaps in the game board are refilled, either by pre-existing game elements moving to these locations, new game elements entering the grid and moving to these locations, or a combination of the two. The refilling action takes place in keeping with the physics of the game world. The reservation graphic is not acted on by the game physics and does not interact with other game elements. In this way blocks moving around the game board are allowed to pass through the reservation graphic and the reserved tile.

An end trajectory is set for each block that moves during refill. This may or may not correspond to an empty tile depending on the direction of refill. E.g. if refill is from above blocks may fall directly into empty tiles. However, if refill is within the plane of the game board blocks may slide from one position on the game board to another to fill gaps and/or enter the game board at an edge where there is already a gap. There may be as many new blocks as there are gaps to fill, minus the reserved tile.

The end trajectory is the endpoint destination and may also include the path or route taken by the block to reach that endpoint. The path is how the visual indication of the moving block is rendered on the game board while under the influence of the game physics. In an example a new block may have a path that does not simply pass over other blocks, but that shows it falling downwards in gaps or along open paths between stationary blocks.

The end trajectory, or final endpoint, is assigned to each block corresponding to a final tile. The trajectories assigned for a refill may include how both new and pre-existing blocks move on the game board to fill gaps.

The algorithm waits for the game board refill to be completed S1320. When the refill of the game board has completed the algorithm continues to the next step S1322.

The reservation graphic can then be removed S1322. After refill of the unreserved tiles the reservation graphic is no longer required as a place holder.

The final step S1324 of the algorithm is to create a booster in the reserved tile. The reserved tile can thus be released and filled with the expected booster. The type of booster to be created at the reserved location may be known by the user, as it may be a result of the particular match he has made. There are different activation possibilities for the booster. The booster may be activated automatically upon creation. The created booster may be activated automatically after a predetermined amount of time since creation. The booster may only be activated when selected by the user and until this time behave as determined by the physics of the game.

The type of booster may be indicated on adjacent matching blocks by a symbol. This symbol may be shown prior to the user selecting one block for removal. An example of this symbol can be seen in FIGS. 3A to 5B. A different symbol indicating a different type of booster can be seen in FIGS. 7B to 7B. The symbol or surface marking created indicates to the user the type of booster which can be created.

Figure 14:
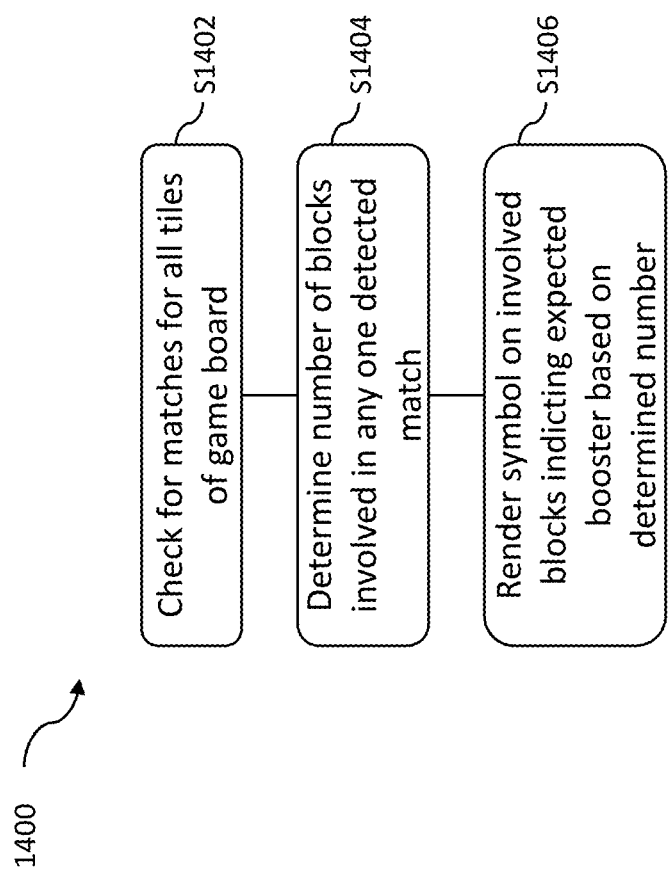
FIG. 14 shows a flow diagram illustrating a symbol creation component.

FIG. 14 shows a flow diagram illustrating a symbol creation component 1400. In a first step S1402 all the tiles of the game board are checked for matches. That is to say, all the tiles of the game board are checked to see if the block in that tile is adjacent to one or more matching blocks. No action is taken as a direct result of this check, and the check is performed after every move.

If there is a match present on the game board, the number of blocks involved in each match is determined S1404. The number of blocks in a match may directly determine the type of booster the match is expected to create.

A symbol can then be rendered to indicate which blocks will create an expected booster S1406. A different symbol representing the type of expected booster may be rendered. The symbol may be rendered on each block involved in the match which may result in that booster being created. Each time a move is made any potential matches and their resulting expected boosters can be re-evaluated. There may be more than one potential match on the game board at any one time. There may be more than one expected booster type indicated on the game board at any one time. There may be a minimum number of blocks required to be involved in the match before a booster can be created. For matches involving less than a minimum number of blocks required for creating a booster there may be no booster symbol rendered.

Boosters may be combined to create different and/or more powerful boosters. Symbols may be rendered on blocks adjacent to existing boosters to indicate the booster which may be created from the potential match and/or the subsequently resulting combination booster. The symbol may alternate between the symbol for the expected combination booster and the expected booster for that particular match. That is to say the symbol may alternate between the standalone booster for that individual potential match and the expected combination booster, within the same block. The user may choose to create the combination booster by selecting the block of the match adjacent to the existing booster. Alternatively, the user may choose to select a block of the match not adjacent to an existing booster and instead create the standalone booster in a different location. This allows the user more control over the created boosters and a larger range of strategic choices during game play.

During creation of boosters by the above described method, locations on the game board grid are reserved.

Figure 15:
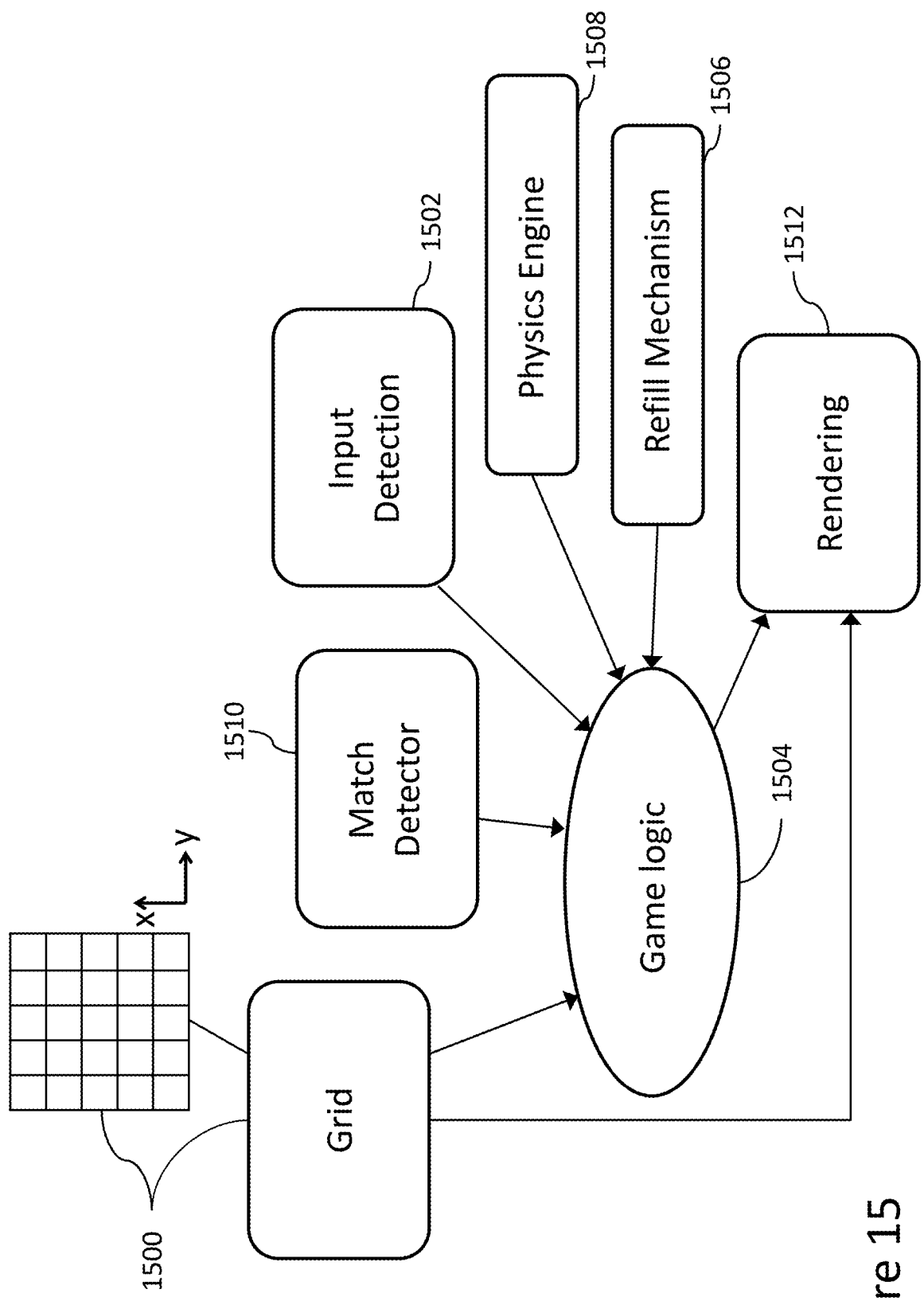
FIG. 15 is a schematic representation of the functional blocks of an embodiment.

FIG. 15 shows a schematic representation of the functional blocks of an embodiment of the present invention used to enable game play such as that discussed above. Input detection 1502 captures the user input and feeds the input to the game logic 1504. The user input can be provided via any suitable user input device, such as those described above. In the context of the game, this user input can be used to indicate which game objects have been selected by a user, and thus to indicate the location of the subsequently created blocker. The game logic 1504 will process the information provided by the user input. The game logic 1504 may then determine if a valid selection has been made, and what the outcomes of such a selection should be.

A grid component 1500 stored in a memory provides a grid representation of the game board as shown schematically in FIG. 15. The grid component can be supplied by any suitable data structure (1600 in FIG. 16), held in local memory or remote memory accessible by the device, and is responsible for identifying each tile location on the game board and thus providing a tile ID with which to associate information about the game element displayed at that tile location. This associated information may then be used in combination with other components in order to control the rendering of the display, e.g. the match detector component 1510, and the refill mechanism component 1506.

Each game element has object data associated therewith. The object data may be stored in any suitable memory location. In some embodiments, the object data may be provided by the data structure 1600 described later. In some embodiments, the object data may be considered to be part of the game logic and in other embodiments may be considered to be outside the game logic. The object data may provide information as to the properties of a game element or block. These properties can include attribute information such as colour and/or whether or not a game element has a particular function such as a booster function.

The game logic 1504 will check if a game element satisfies the rule or rules for a valid match using the match detector logic 1510. The rule or rules may define whether or not certain match criteria have been satisfied. The specific conditions may be dependent on the particular game being played.

Thus, the game logic controls the rules for determining if a valid match is present or selected. The game logic will have access to data for each tile including its tile ID designating its location on the grid 1500, and associated tile data providing information about the contents of that tile, e.g. the game element within that tile or at least one characteristic associated with the game element within that tile. The game logic will thus be able to determine if a valid match condition has been met. If a valid match condition is met, the game elements in the match may be removed from those respective tiles. The grid can be considered as a map which may be used to determine the relative position of each tile on the game board from the tile ID. In embodiments of the present invention, the grid 1500 is implemented as a two-dimensional grid. The grid 1500 is shown with two dimensions x and y. However, any alpha numerical designation can be used as the tile ID. No logical relationship between tile IDs is required. However, the grid position relationship between tile IDs may be determinable from the tile ID alone, e.g. by using an array of tiles with numbered rows and lettered columns. The position of a game element may be either where the game element is or where the game element is going (e.g. the end point of a game element moving due to a refill).

Once a match between blocks has been successfully made across a number of tiles of the grid, these blocks may be removed and the respective tiles will become empty. At this stage a refill of the empty tiles is required based on the refill mechanism 1506. The refill mechanism may also have conditions on which it relies. For example, other moves or actions taking place on the game board may have to be completed before the refill mechanism can take place. In another example a refill may prevent other actions from being completed. For example, in the present invention the refill mechanism may prevent the creation of a booster until the refill is complete.

Each tile of the grid 1500 may be associated with data to indicate a status such as filled or unfilled (empty). In addition a flag can indicate if the tile is reserved, or unreserved. Thus, when the game board is refilled, each tile of the grid may be checked for such a status. Upon determining that there are tiles which are empty, the need to refill these tiles is recognized. The refill mechanism may then determine whether the tiles to be refilled are reserved. The reservation of a tile may be indicated using a flag or variable. The flag or variable (RESERVED) may be included in the tile data associated with the tile ID. The presence of the flag or variable indicates the reserved status of the particular tile and may be read by a layer of logic in the refill mechanism. Boolean logic may be used to determine whether a tile is to be refilled using the filled and reserved status of the tiles of the grid. The tiles must satisfy both conditions of being unfilled and being unreserved in order to be refilled. As part of the refill mechanism empty tiles which are not reserved are designated as the end point for particular blocks. This may be as the end point of a block already on the board and moving as a result of a game move due to the action of the physics 1508, or as the end point of a new block entering the game board. The physics engine component 1508 is configured to control the movement of moving game elements on the display. The physics engine 1508 may be part of the game logic 1504.

A filled tile will be treated by the game logic as a solid entity, preventing any other game objects from passing through this particular tile. By filled tile it is meant that the tile is occupied by a game element, e.g. a block, a booster etc. In this way the game logic may also force the refill mechanism to conform to certain refill trajectories or paths. That is to say new or moving game elements will not be able to pass through or refill through filled tiles. It should be appreciated that the terms pass through and refill through are dependent on the specific game rules, e.g. some game boards may refill from a direction perpendicular to the plane of the game board.

For tiles designated as reserved no block is assigned the respective tile ID as its end point. As such the tile acquires a status that is empty but reserved. The reserved status is associated directly with the tile ID. The reserved tile is the tile positioned on the grid 1500 (and thus having the same tile ID) specified by the received user input when selecting the match (as described above). During a refill a reserved tile is not seen by the game logic to be a valid end point for blocks. That is to say the reserved tile ID is ignored and passed over for refill, the moving blocks or new blocks are subsequently not able to sit there. Only the identified tiles with corresponding tile data indicating that they are both empty and not reserved are refilled.

Once the refill mechanism has completed the grid refill any reserved tiles are liberated. For example, the flag or variable indicating their reserved status is removed. This allows for the game logic to continue as normal from that point on, e.g. the booster created at that location may then function as it does in regular game play and any resulting spaces after booster use can be refilled as normal (including any previously reserved tile(s)). The tile may thus be unreserved as soon as the booster is created.

Figure 16:
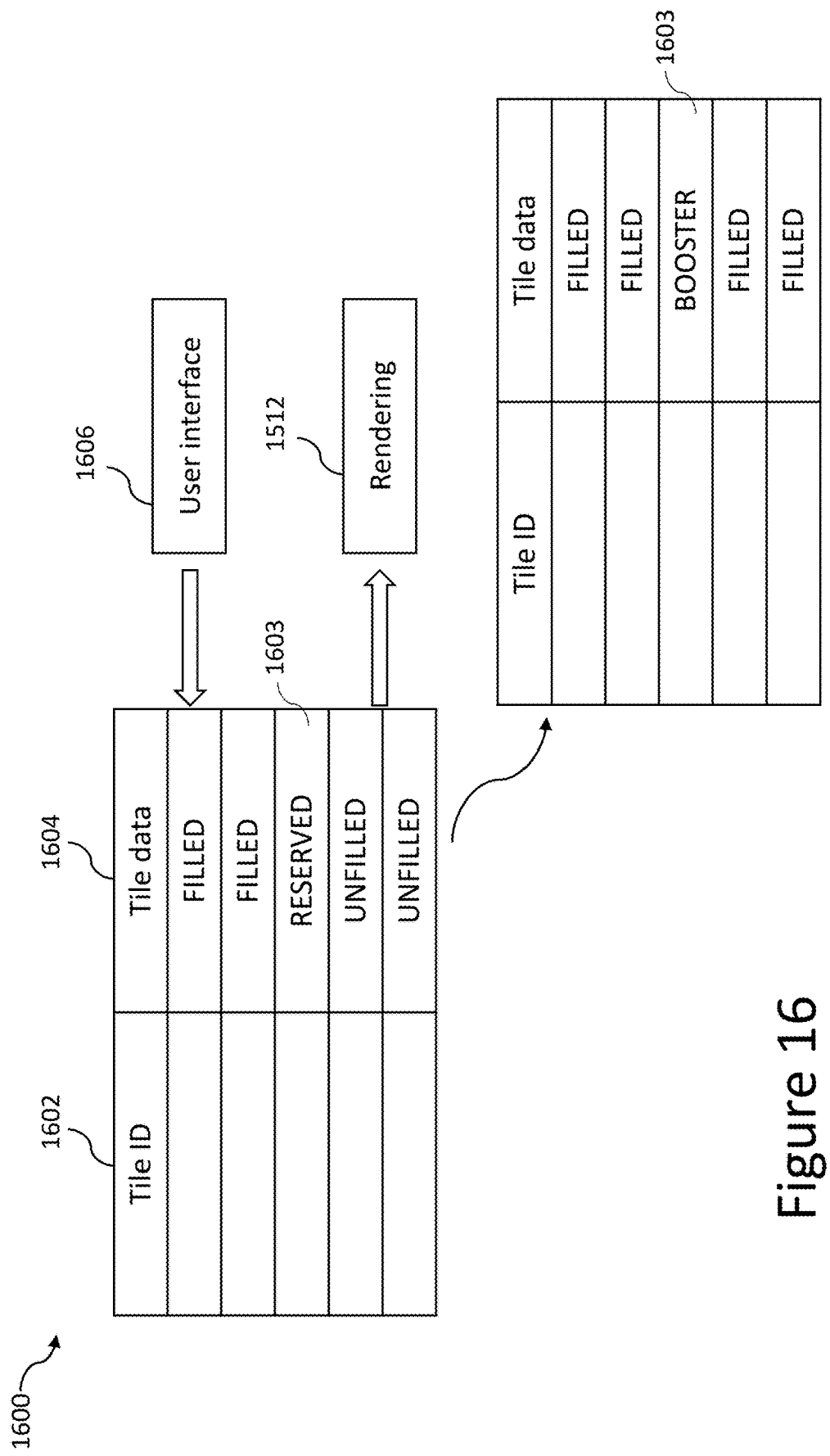
FIG. 16 is a schematic diagram of a tile data structure.

FIG. 16 illustrates a data structure for managing the tile appearance. The data structure 1600 can be held in any suitable storage circuitry, such as in the memory of the user device. The rendering component 1512 drives the display on a user interface 1606 which receives the video output from the graphics controller.

The data structure 1600 is responsible for providing the information used to control the game board displayed. Each tile has a tile ID 1602. The tile ID 1602 defines the position in the grid 1500, and thus on the user interface, of the tile where the corresponding tile data is to be positioned. This allows the rendering component 1512 to generate the contents of the specifically identified tile at the correct position on the user interface display 1606. Each tile ID 1602 is associated with tile data 1604. Tile data 1604 provides corresponding data for the particular tile ID, e.g. defines whether a game element occupies the tile, which game element occupies that tile, whether the tile is reserved etc. Note in FIG. 16 the change in status if tile 1603 from 'RESERVED' during refill to 'BOOSTER' after refill.

To render the game board on the display of a computer device, tile data 1604 is extracted for each tile ID (position) 1602 from the data structure 1600 and supplied to the rendering component 1512 to allow each tile position to be rendered. Thus for example, a tile can show a game element moving or stationary or a reservation graphic, depending on the extracted tile data. The game logic 1504 may handle these as distinct events, while the rendering component 1512 may amalgamate them to display all active game elements at the particular tile location concurrently.

In embodiments the booster may be created based on a timer elapsing. For example, the user clicks a combo forming a match which will result in the creation of a booster. The tile in which the user clicks may then be reserved, and upon selecting the tile by the user the reserved graphic is displayed within the selected tile and a 'new booster' timer is started. The timer may then begin to count down, during which time the reservation graphic continues to be displayed within the selected tile. During the period of the timer the game board may be refilled around the reserved tile as discussed above. Upon the elapsing of the 'new booster' timer the new booster is created and the reservation graphic is removed. The booster is thus created based on the elapsing of the new booster timer, and does not wait for the refill to be completed. In this way the refill and the booster timer may run in parallel. If the time for refill is longer than the time of the new booster timer, the new booster timer may elapse before the refill is completed. This may resulting in the booster being created part way through the refill and subsequently moving within the refill for the remaining run time of the refill, as per the physics of a normal refill where boosters are present. If the refill runs for less time than the new booster timer, the booster may not be created until after the refill has finished. Thus the tile is reserved for the duration of the refill, and the booster is created and remains in the tile selected by the user at least until the next move.

In embodiments the booster is created straight away. That is to say, the booster is created upon selection by the user of a particular block within a match, and is created at that identified spot. The booster is created as a floating non-moving game element. Therefore during refill blocks are able to refill tiles of the grid below the booster if space allows (e.g. if there are unfilled tiles to be refilled). The booster maintains its position on the game board, acting to reserve the tile from being allocated during refill. In one embodiment, the booster may remain in that location until activated. In another embodiment, it may act as a 'normal' game element, for example it may fall down as a result of matched game elements being selected below it. Upon activation of the booster the tile ID is no longer associated with being reserved. The tile can once again be designated as unfilled and is able to be allocated to a block during a subsequent refill.

It should be appreciated that in other embodiments, the game may use any type of mechanic such as switching, sliding or linking. The game elements may be any suitable game element and in some embodiments may be letters. In that scenario a match will occur when the letters match a word.

The invention claimed is:

1. A method of controlling a user interface of a computer device on which a game board of multiple user-selectable game element is displayed, the method comprising:
    detecting a game element selected by a user;
    identifying a location on the game board at which the selected game element was selected by the user;
    removing two or more game elements from the game board, including the selected game element;
    providing replacement game elements on the game board to replace the removed game elements, except at the identified location;
    creating a booster object at the identified location, after providing the replacement game element on the game board, wherein the booster object is activatable at the identified location to perform a function to aid the user in game play.

2. The method of claim 1, wherein the game element selected by the user is one of multiple adjacent matching game elements, wherein the multiple adjacent matching game elements are removed.

3. The method of claim 1, wherein providing replacement game elements comprises designating an end point location on the game board to receive respective replacement game elements, wherein the identified location is not designated as an end point and does not receive a replacement game element.

4. The method of claim 1, wherein the method comprises:
    detecting a second game element selected by a user;
    identifying a second location on the game board of the selected second game element;
    removing said selected second game element and any matching adjacent game elements from the game board;
    providing replacement game elements on the game board to replace the removed game elements, except at the identified second location; and
    creating a second booster object at the second identified location, wherein the booster object and the second booster object enable a combo booster to be created, activatable at one of the identified locations.

5. The method of claim 1, wherein a visual indication is provided on the game board at the identified location.

6. The method of claim 5, wherein the visual indication is replaced by an image of the booster when the booster object is created.

7. The method of claim 1, wherein the booster object is created after elapse of a time period from removal of the one or more game elements, the time period governed by a timer independently of the time taken to provide replacement game elements.

8. The method of claim 1, wherein the booster object is created in the identified location and does not move while replacement game elements are being provided.

9. The method of claim 1, wherein the booster object is activated automatically when the game board is set after replacement of the game elements.

10. The method of claim 1, wherein the booster object is activated in response to user selection.

11. The method of claim 1, wherein replacement game elements are provided according to a defined physics which defines a path along which replacement game elements are provided to the board, wherein the replacement game elements move along the path and over the identified location without refilling the identified location.

12. The method of claim 1, wherein the booster object is created when all replacement game objects have been provided to set the game board for a subsequent game move.

13. The method of claim 2, comprising determining the number of game elements in a removable set which are contiguous and matching, and selecting a booster type available on removal of the set from a plurality of booster types, based on the number.

14. The method of claim 13, comprising generating and displaying an indicator of the booster type on one or more of the game elements in the removable set.

15. A computer device comprising:
    a user interface configured to display a game board;
    a memory;
    at least one processor; and
    computer readable instructions which when executed on the at least one processor cause the processor to implement the steps of:
    detecting a game element selected by a user;
    identifying a location on the game board at which the selected game element was selected by the user;
    removing two or more game elements from the game board, including the selected game element;
    providing replacement game elements on the game board to replace the removed game elements, except at the identified location;
    creating a booster object at the identified location, after providing the replacement game element on the game board, wherein the booster object is activatable at the identified location to perform a function to aid the user in game play.

16. The computer device of claim 15 comprising a network interface configured to receive game data from a server in communication with the network interface, the game data comprising at least one booster available to the user for which the booster object is creatable.

17. The computer device of claim 15, wherein the game element selected by the user is one of multiple adjacent matching game elements, wherein the multiple adjacent matching game elements are removed.

18. The computer device of claim 15, wherein providing replacement game elements comprises designating an end point location on the game board to receive respective replacement game elements, wherein the identified location is not designated as an end point and does not receive a replacement game element.

19. The computer device of claim 15, wherein replacement game elements are provided according to a defined physics which defines a path along which replacement game elements are provided to the board, wherein the replacement game elements move along the path and over the identified location without refilling the identified location.

20. A non-transitory computer readable medium having computer instructions stored thereon which when executed by a processor cause the processor to control a user interface of a computer device on which a game board of multiple user-selectable game element is displayed by performing the steps of:
    detecting a game element selected by a user;
    identifying a location on the game board at which the selected game element was selected by the user;
    removing two or more game elements from the game board, including the selected game element;
    providing replacement game elements on the game board to replace the removed game elements, except at the identified location;
    creating a booster object at the identified location, after providing the replacement game element on the game board, wherein the booster object is activatable at the identified location to perform a function to aid the user in game play.

* * * * *